(12) United States Patent
Newman et al.

(10) Patent No.: US 7,433,077 B2
(45) Date of Patent: Oct. 7, 2008

(54) GAMUT MAPPING BETWEEN MULTIPLE BOUNDARY REGIONS

(75) Inventors: Todd D. Newman, Palo Alto, CA (US);
John S. Haikin, Fremont, CA (US);
Sharon A. Henley, Mountain View, CA (US)

(73) Assignees: Canon Kabushiki Kaisha, Tokyo (JP);
Microsoft Corporation, Redmond, WA (US)

( * ) Notice: Subject to any disclaimer, the term of this patent is extended or adjusted under 35 U.S.C. 154(b) by 528 days.

(21) Appl. No.: 10/651,232

(22) Filed: Aug. 28, 2003

(65) Prior Publication Data

US 2005/0047654 A1 Mar. 3, 2005

(51) Int. Cl.
*H04N 1/46* (2006.01)

(52) U.S. Cl. ............... 358/1.9; 358/515; 382/167

(58) Field of Classification Search ......... 358/515–517, 358/1.9; 382/162, 164, 167
See application file for complete search history.

(56) References Cited

U.S. PATENT DOCUMENTS

| | | | | | |
|---|---|---|---|---|---|
| 5,323,249 | A | * | 6/1994 | Liang | 358/518 |
| 5,903,275 | A | * | 5/1999 | Guay | 345/590 |
| 6,008,907 | A | * | 12/1999 | Vigneau et al. | 358/1.9 |
| 6,603,483 | B1 | | 8/2003 | Newman | 345/593 |
| 6,912,306 | B1 | * | 6/2005 | Nakabayashi et al. | 382/167 |
| 2001/0031084 | A1 | | 10/2001 | Cannata et al. | 382/167 |
| 2002/0012461 | A1 | | 1/2002 | MacKinnon et al. | 382/164 |
| 2002/0041393 | A1 | * | 4/2002 | Takahashi et al. | 358/1.15 |
| 2002/0097907 | A1 | | 7/2002 | Fukasawa | 382/167 |
| 2002/0150289 | A1 | * | 10/2002 | Zeng | 382/162 |
| 2003/0016862 | A1 | | 1/2003 | Ohga | 382/162 |
| 2003/0160801 | A1 | * | 8/2003 | Butler | 345/604 |
| 2005/0117948 | A1 | * | 6/2005 | Hatta et al. | 400/62 |

OTHER PUBLICATIONS

U.S. Appl. No. 09/443,796, filed Nov. 19, 1999 (Newman et al.), pending.
U.S. Appl. No. 09/540,012, filed Mar. 31, 2000 (Haikin et al.), pending.
Braun, G. J. and Fairchild, M. D., "Techniques for Gamut Surface Definition and Visualization", *Proceedings of the Fifth IS&T/SID Color Imaging Conference*, pp. 147-152 (1997).
Stone, M. David, "Color Matching", http://www.extremetech.com/article2/ (assorted web pages).
Morovic, J. and Luo, M.R., "The Fundamentals of Gamut Mapping: A Survey", *J. Imaging Sci. and Tech.*, pp. 283-290 (2001).
Morovic, Jan, "To Develop a Universal Gamut Mapping Algorithm", Univ. of Derby Ph.D. Thesis (Oct. 1998).
Braun, Gus, "A Paradigm for Color Gamut Mapping of Pictorial Images", Ph.D. Thesis, RIT. (1999).

* cited by examiner

*Primary Examiner*—Edward L. Coles
*Assistant Examiner*—James A Thompson
(74) *Attorney, Agent, or Firm*—Fitzpatrick, Cella, Harper & Scinto

(57) ABSTRACT

Mapping color image data from a source color gamut to a destination color gamut, wherein the mapping includes identifying source color boundary regions in the source color gamut based on descriptor data provided in a source color descriptor data structure, and determining a position of each identified source color boundary region, identifying destination color boundary regions in the destination color gamut based on descriptor data provided in a destination color descriptor data structure, and determining a position of each identified destination color boundary region, and mapping the color image data from the identified source color boundary regions to the identified destination color boundary regions based on a correspondence between the determined positions of the identified source color boundary regions and the determined positions of the identified destination color boundary regions.

15 Claims, 17 Drawing Sheets

GAMUT MAPPING BETWEEN MULTIPLE BOUNDARY REGIONS

BACKGROUND OF THE INVENTION

1. Field of the Invention

The present invention relates to the gamut mapping of color image data from within a source color gamut to within a destination color gamut. In particular, the present invention maps the color image data to within the destination color gamut by identifying source color boundary regions in the source color gamut based on descriptor data provided in a source color descriptor data structure, identifying destination color boundary regions in the destination color gamut based on descriptor data provided in a destination color descriptor data structure, and mapping the color image data from the identified source color boundary regions to be within the corresponding identified destination color boundary regions based on the relative positions of the identified source color boundary regions with respect to the positions of the identified destination color boundary regions.

2. Incorporation by Reference

U.S. patent application Ser. No. 10/651,007, filed Aug. 28, 2003, entitled "Color Descriptor Data Structure", is incorporated herein by reference.

3. Description of the Related Art

The use of gamut mapping algorithms in the field of graphic arts is known; they are used to reproduce an image which was rendered by an input device on an output device, where the input device and the output device typically have different gamut boundaries with respect to each other. In other words, the gamut of colors that can be reasonably reproduced by the input device is typically not the same as the gamut of colors that can be reasonably reproduced by the input device. In such a situation, the gamut boundaries of the two devices are different, and so gamut mapping is used to render the image from within the input device gamut boundary to within the output device gamut boundary, so as to more accurately reproduce the color image on the output device.

Gamut mapping of image data from one gamut boundary to another in the graphic arts field is typically performed using a gamut mapping algorithm which is a particular method of mapping color data between gamut boundaries. In addition, the gamut mapping algorithm often uses gamut boundary descriptors for both the input and the output device in order to obtain a reference between the two gamut boundaries for appropriate gamut mapping of the image.

When gamut mapping a rendered picture of an input medium, such as a developed print on photographic paper or a magazine picture, to an output medium on an output device, the white point and the black point of the input medium are typically mapped to the white point and the black point of the output medium. The colors between the white point and the black point of the input medium are then mapped to fall between white point and the black point of the output medium. In the case that the rendered picture on the input medium includes a whitest-white, such as light reflecting off of a chrome bumper or such as a light bulb, and a diffuse white, such as a white shirt, the whitest-white is generally mapped to the white point of the input medium, and the diffuse white is mapped to a neutral color of the input medium which is darker than the medium's white point. In this manner, the range of "whites" of the rendered photograph fall between the white point and the black point of the input medium. In this example, the whitest-white represented at the white point of the input medium is mapped to the white point of the output medium, and the diffuse white at the particular neutral point of the input medium is mapped to a particular neutral point of the output medium. In such a case, the white points and the particular neutral points of the input medium and of the output medium are often not the same.

Gamut mapping becomes more difficult when using an unrendered picture from an input device such as a camera or a video camera. In such cases, the whitest white point of the photographed scene, such as a specular white, an emissive white, or a diffuse white, is not necessarily mapped to the white point of the input medium, such as photographic film, videotape, or digital media. Neither is the blackest point of the photographed scene necessarily mapped to the black point of the input medium. This present problems when gamut mapping the unrendered picture from the input device, such as a camera, to an output medium in an output device, such as a printer, primarily because it is not known at the time of gamut mapping where the whitest-white points and the blackest-black points of the unrendered picture fall on the input medium with respect to the white point and the black point of the input medium.

Input media such as photographic film and digital video provide "headroom" to render portions of the scene falling between "white with detail", such as diffuse white, and "white without detail" such as specular white. Similarly, photographic film and digital video also provide "footroom" to render portions of the scene falling between "black with detail", such as shadow black, and "black without detail", such as a blackest-black. In the video industry, a standard encoding is used to represent colors of the scene. Such a standard encoding is the ITU 709 specification in which luminance (Y), which depicts whiteness, is encoded in 8 bits, thereby allowing values between 0 to 255. In this standard, reference black is encoded at a luminance value of 16, and reference white is encoded at a luminance value of 235, thereby leaving the range between 236 and 255 to represent specular highlights and emissive sources, and the range of 0 to 15 to represent shadow blacks. Thus, there is substantial headroom and footroom in the encoding scheme that go unused in a typical representation of a device gamut, thereby resulting in an incomplete depiction of the true gamut of the device. In addition, the encoded gamut description of such a device that is bound by the above-referenced encoding ranges is typically based on measured color values from a standardized color target. Such a standardized color target contains color patches or samples which are only a subset of the range of colors that the device can reasonably be expected to produce.

The video industry is generally based on reference devices and standardized encoding. This means that gamut boundary information of a particular video device is not needed for rendering of an image from the particular video device on another video device because all video images are encoded for reproduction on the same standardized reference device. Unfortunately for the graphic arts industry, when it is desired to reproduce an unrendered image from a particular video device on an output device such as a printer, optimal tonal mapping is difficult, if not impossible. This is because the gamut mapping is not provided with information about the location of whitest-white and diffuse white with respect to the white point of the input medium, and is not provided with information about the location of blackest-black and shadow black with respect to the black point of the input medium. Neither is the gamut mapping provided with information about the location of various tonal gray points falling between blackest-black and whitest-white of the input medium.

In addition to the above-mentioned problems with gamut mapping during the reproduction of unrendered photographic and video images onto an output device with a different gamut boundary, photographic and video devices produce gray colors which do not necessarily fall on the neutral axis of the color appearance model used to depict the color gamut of the photograph and/or video device. A typical color appearance model is in CIECAM02 JCh color space, and gray colors of the photographic and/or video device may not necessarily fall on the J axis, where chroma (C) has a zero value. This representation of gray colors in the color appearance model for photographic and/or video devices is very problematic for gamut mapping algorithms which expect gray colors to fall directly on the J axis, where chroma (C) has a zero value.

The above-referenced problems result in inferior reproduction of color images because color image data often includes colors that are outside of the supplied color gamut boundary descriptor, which is often based on a standardized target and does not reflect all reasonably expected colors that can be produced by the corresponding device. For example, ICC device profiles do not provide sufficient information of a device's color gamut descriptor to accommodate unexpected colors, or to determine the tonal curve of neutral grays of the given device. Accordingly, the ICC device profiles for different devices often do not interoperate well during gamut mapping to within the destination color gamut, and often leads to "color contouring" effects in images where unexpected colors are clipped. Also, gamut mapping algorithms are typically predetermined in a device profile, and is therefore not flexible enough to accommodate the needs and desires of different users. Therefore, even if a more accurate gamut descriptor were provided for one or both devices involved in the gamut mapping, the user could not select a gamut mapping algorithm that takes advantage of the more accurate gamut descriptor.

Accordingly, it is desirable to find a solution to the foregoing problems. In particular, it is desirable to adequately gamut map the range of colors of a source input device or a source image that range from the source reference (measured) colors, such as diffuse white and shadow black, up to the source plausible (reasonably expected) colors, such as whitest-white and blackest black, into appropriate corresponding regions in the color gamut of the destination medium. It is also desirable to adequately gamut map the neutral gray colors of the source input device or source image into the neutral gray colors of the destination medium.

SUMMARY OF THE INVENTION

The present invention addresses the foregoing problems by providing a method for adequately gamut mapping the range of colors of a source input device or a source image that range from the source reference (measured) colors, such as diffuse white and shadow black, up to the source plausible (reasonably expected) colors, such as whitest-white and blackest black, into appropriate corresponding regions in the color gamut of the destination medium, and for adequately gamut mapping the neutral gray colors of the source input device or source image into the neutral gray colors of the destination medium. The present invention selects an appropriate gamut mapping scheme depending on the identified color boundaries of the source and destination media which are provided in their respective color boundary descriptors, thereby performing appropriate color gamut mapping even when the respective color boundaries are of different shapes and sizes.

In one aspect, the invention is directed to the mapping of color image data from a source color gamut to a destination color gamut, wherein the mapping includes identifying source color boundary regions in the source color gamut based on descriptor data provided in a source color descriptor data structure, and determining a position of each identified source color boundary region, identifying destination color boundary regions in the destination color gamut based on descriptor data provided in a destination color descriptor data structure, and determining a position of each identified destination color boundary region, and mapping the color image data from the identified source color boundary regions to the identified destination color boundary regions based on a correspondence between the determined positions of the identified source color boundary regions and the determined positions of the identified destination color boundary regions.

Preferably, the identified color boundary regions include a reference color boundary region, a plausible color boundary region, and a possible color boundary region, which can be separated from each other in color space, or which can be collapsed upon each other depending on the type of device and/or image represented, and depending on how the color descriptor data for the color boundary regions was prepared. The gamut mapping scheme is preferably selected from a variety of schemes depending on the relative positions of the source and destination color boundary regions. In addition, source and destination neutral tone curves are identified based on descriptor data provided in the respective color descriptor data, so that the color image data can be mapped from the source neutral tone curve into the destination neutral tone curve. In the event that descriptor data is not provided for the source or destination neutral tone curves, the gamut mapping algorithm preferably generates the missing neutral tone curve as needed, based on the type of color image data being mapped, or based on a predetermined scheme.

In this manner, the gamut mapping of the present invention utilizes supplied descriptions of color boundary regions of a source and of a destination media so that a source image can be appropriately gamut mapped to an output medium on an output device, such as a printer, for a proper reproduction of the source image on the output medium. The gamut mapping of the present invention allows an appropriate gamut mapping scheme to be selected depending on the identified types of color boundary regions corresponding to the source and of a destination media, thereby resulting in a more accurate reproduction of the color image.

According to another aspect of the invention, mapping of color image data from a source color gamut to a destination color gamut is performed by identifying source color boundary regions in the source color gamut based on descriptor data provided in a source color descriptor data structure, and determining a position of each identified source color boundary region, the source color boundary regions including a source reference color boundary region representing reference colors based on measured colors and including a source reference-white color and a source reference-black color, a source plausible color boundary region representing plausible colors which are observable, encompassing at least the source reference color boundary region and including a source whitest-white color and a source blackest-black color, and a source possible color boundary region representing possible colors supported by a predetermined color encoding scheme and encompassing at least the source plausible color boundary region. Destination color boundary regions in the destination color gamut are identified based on descriptor data provided in a destination color descriptor data structure, and a position is determined of each identified destination color boundary region, the destination color boundary regions including a destination reference color boundary region representing reference colors based on measured colors and including a destination reference-white color and a destination reference-black color, a destination plausible color boundary region representing plausible colors which are observable, encompassing at least the destination reference color boundary region and including a destination whitest-white color and a destination blackest-black color, and a destination possible color boundary region representing possible colors supported by a predetermined color encoding scheme and encompassing at least the destination plausible color boundary region. In the case that the source possible color boundary region is larger than the source plausible color boundary region which is larger than the source reference color boundary region, and the destination possible color boundary region is larger than the destination plausible color boundary region which is larger than the destination reference color boundary region, mapping is performed on all colors disposed between the source possible color boundary region and the source plausible color boundary region to an outer boundary of the destination plausible color boundary region, all colors disposed between the source plausible color boundary region and the source reference color boundary region to be disposed between the destination plausible color boundary region and the destination reference color boundary region, and all colors within the source reference color boundary region to be disposed within the destination reference color boundary region. In the case that the source possible color boundary region is larger than the source plausible color boundary region which is larger than the source reference color boundary region, and the destination possible color boundary region is equal to the destination plausible color boundary region which is equal to the destination reference color boundary region, mapping is performed for all colors disposed between the source possible color boundary region and the source plausible color boundary region to an outer boundary of the destination reference color boundary region, all colors disposed between the source plausible color boundary region and the source reference color boundary region to be disposed within the destination reference color boundary region, and all colors within the source reference color boundary region to be disposed within the destination reference color boundary region. In the case that the destination possible color boundary region is larger than the destination plausible color boundary region which is larger than the destination reference color boundary region, and the source possible color boundary region is equal to the source plausible color boundary region which is equal to the source reference color boundary region, mapping is performed for all colors disposed at an outer boundary of the source reference color boundary region to be disposed between the destination possible color boundary region and the destination plausible color boundary region, a first set of colors disposed within the source reference color boundary region to be disposed between the destination plausible color boundary region and the destination reference color boundary region, and a second set of colors disposed within the source reference color boundary region to be disposed within the destination reference color boundary region. In the case that the source possible color boundary region is equal to the source plausible color boundary region which is equal to the source reference color boundary region, and the destination possible color boundary region is equal to the destination plausible color boundary region which is equal to the destination reference color boundary region, mapping is performed for all colors disposed within the source reference color boundary region to be disposed within the destination reference color boundary region.

Preferably, the reference color boundary region, the plausible color boundary region, and the possible color boundary region can be separated from each other in color space, or can be collapsed upon each other depending on the type of device and/or image represented, and depending on how the color descriptor data for the color boundary regions was prepared. In addition, source and destination neutral tone curves are identified based on descriptor data provided in the respective color descriptor data, so that the color image data can be mapped from the source neutral tone curve into the destination neutral tone curve. In the event that descriptor data is not provided for the source or destination neutral tone curves, the gamut mapping algorithm preferably generates the missing neutral tone curve as needed, based on the type of color image data being mapped, or based on a predetermined scheme.

In this manner, the gamut mapping of the present invention utilizes supplied descriptions of color boundary regions of a source and of a destination media so that a source image can be appropriately gamut mapped to an output medium on an output device, such as a printer, for a proper reproduction of the source image on the output medium. The gamut mapping of the present invention allows an appropriate gamut mapping scheme to be selected depending on the identified types of color boundary regions corresponding to the source and of a destination media, thereby resulting in a more accurate reproduction of the color image.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention provides a color descriptor data structure for a color device which contains a reference boundary descriptor representing reference colors of the color device, a plausible boundary descriptor representing plausible colors of the color device which include a whitest-white color and a blackest-black color, and a neutral color descriptor representing neutral colors of the color device which extend in range from the whitest-white color to the blackest-black color. According to the present invention, the color descriptor data structure can be used to appropriately gamut map an unrendered image, such as a photographic or video image, to an output medium on an output device, such as a printer, so that reproduction of the range of colors from the whitest-white to the blackest-black on the output medium is made possible.

Figure 1:
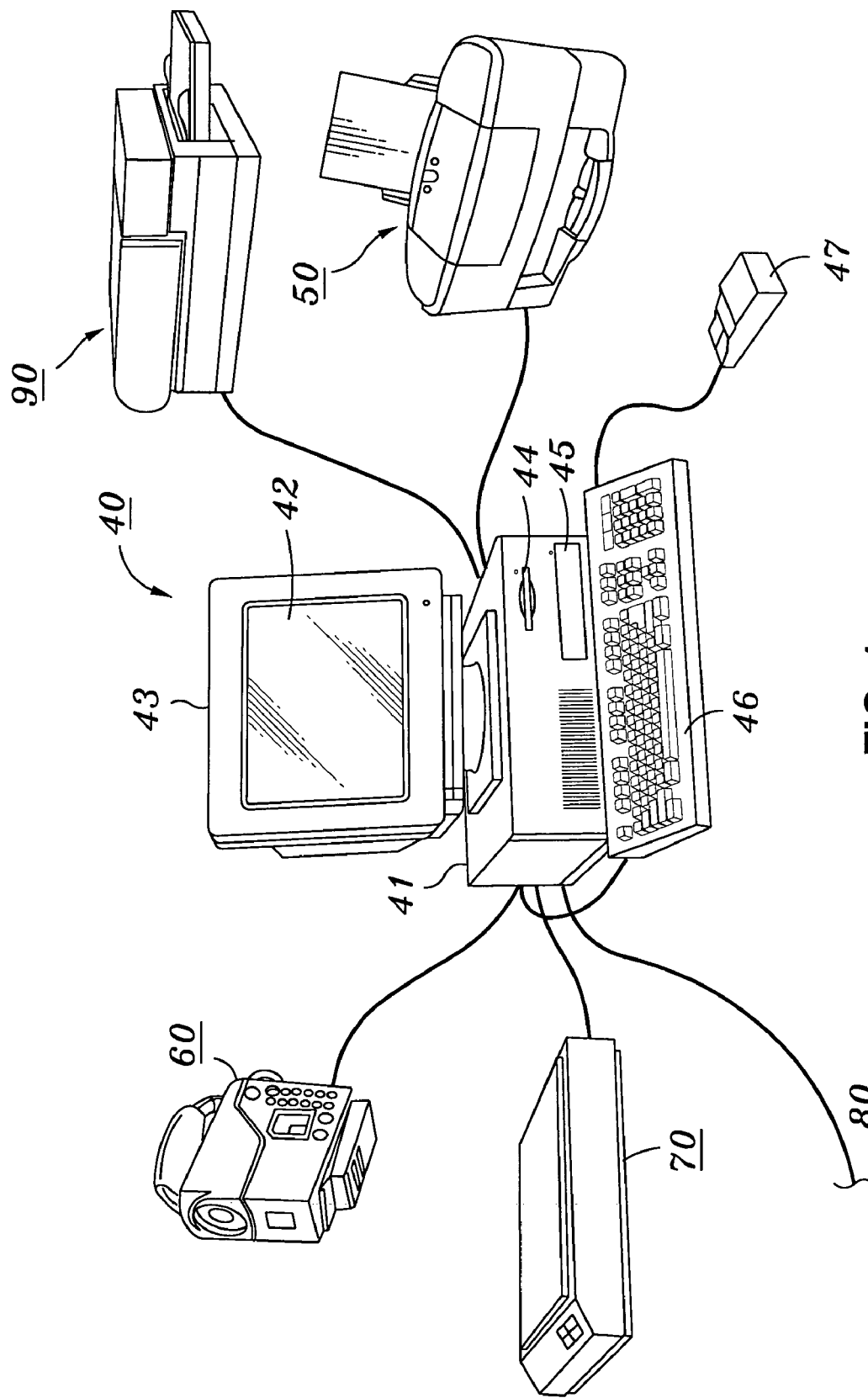
FIG. 1 is a representative view of a computing environment in which the present invention may be implemented according to one embodiment of the invention.

Turning to FIG. 1, a computing environment is shown in which the present invention may be implemented. FIG. 1 depicts a representative computing system including computing equipment, peripherals and digital devices which may be used in connection with the practicing the present invention. Computing equipment 40 includes host processor 41 which comprises a personal computer (hereinafter "PC"), preferably an IBM PC-compatible computer having a windowing environment such as Microsoft Windows 98, Windows 2000, Windows Me, Windows XP, or Windows NT, or other windowing system such as LINUX. In the alternative, host processor 41 may be an Apple computer or other non-windows based computer. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Computing equipment 40 also includes computer-readable memory media such as computer fixed disk 45 and floppy disk drive 44. Floppy disk drive 44 provides a means whereby computing equipment 40 can access information, such as image data, computer-executable process steps, application programs, etc. stored on removable memory media. In the alternative, information can also be retrieved through other means such as a USB storage device connected to a USB port (not shown), or through network interface 80. Also, a CD-ROM drive and/or a DVD drive (not shown) may be included so that computing equipment 40 can access information stored on removable CD-ROM and DVD media.

Printer 50 is a first printer, preferably a color bubble jet printer, which forms color images on a recording medium such as paper or transparencies or the like. Printer 90 is a second printer, preferably an color laser printer, which also forms color images on a recording medium such as paper or transparencies or the like. Preferably, printer 50 and printer 90 form color images using cyan, magenta, yellow and black inks, although the present invention can be used with printers and devices which use other colorant combinations that include black. The invention is also usable with other printers that use such colorant combinations, so long as the printer is capable of being interfaced to computing equipment 40. In addition, digital color scanner 70 is provided for scanning documents and images and sending the corresponding image data to computing equipment 40. Digital color camera 60 is provided for sending digital image data to computing equipment 40. Of course, computing equipment 40 may acquire digital image data from other sources such as a digital video camera, a local area network or the Internet via network interface 80.

Figure 2:
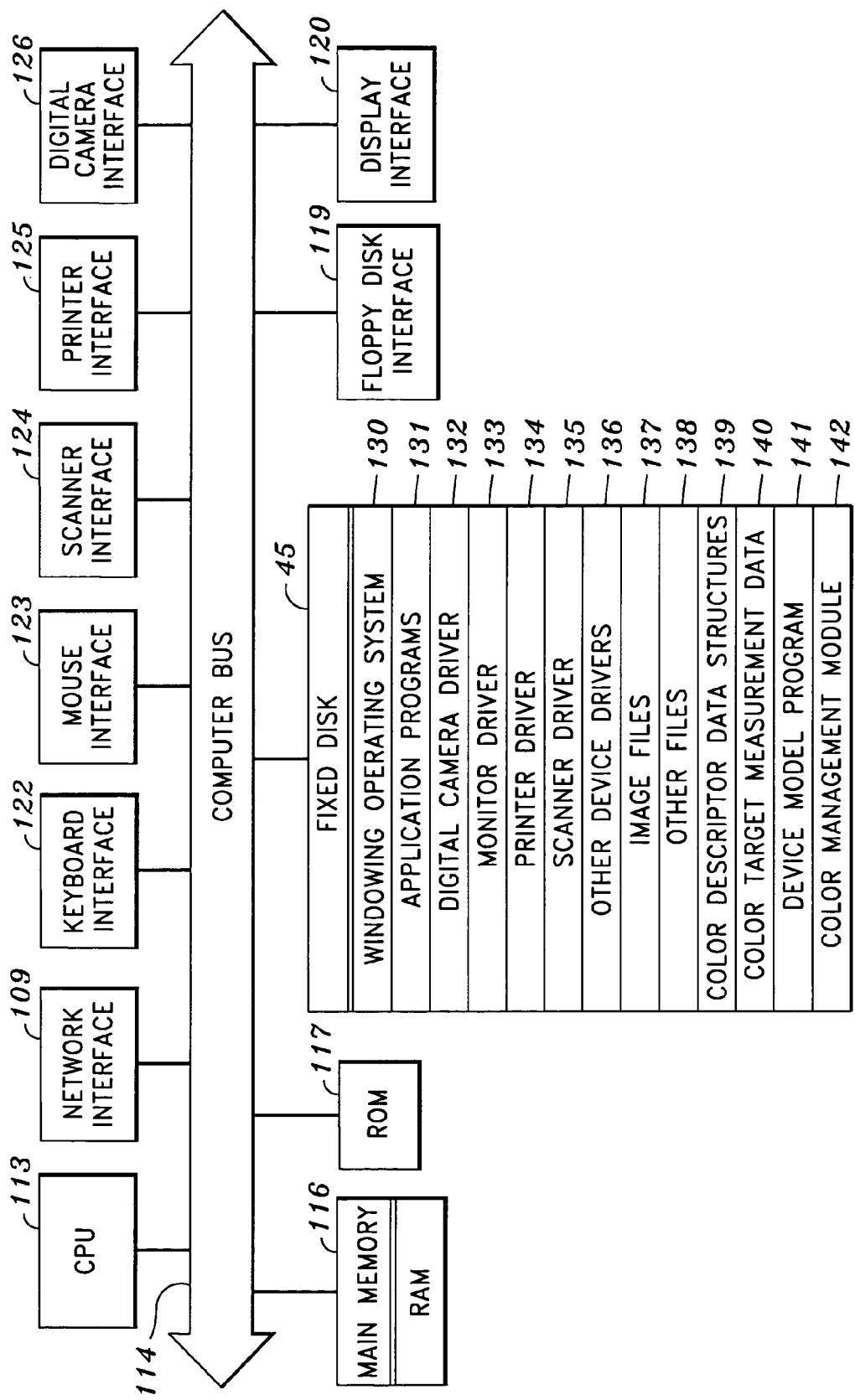
FIG. 2 is a detailed block diagram depicting the internal architecture of the computing device shown in FIG. 1 according to one embodiment of the invention.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as a main run-time transient memory, read only memory (ROM) 117, floppy disk interface 119, display interface 120 for monitor 43, keyboard interface 122 for keyboard 46, mouse interface 123 for pointing device 47, scanner interface 124 for scanner 70, printer interface 125 for printers 50 and 90, and digital camera interface 126 for digital camera 60.

RAM 116 interfaces with computer bus 114 so as to provide information stored in RAM 116 to CPU 113 during execution of software programs such as an operating system, application programs, such as color management module 142, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable process steps need to access and/or modify the data.

As also shown in FIG. 2, fixed disk 45 contains operating system 130, which is preferably a windowing operating system although other operating systems may be used, application programs 131, such as a word processing program or a graphic image management program. Fixed disk 45 also contains digital camera driver 132, monitor driver 133, printer driver 134, scanner driver 135, and other device drivers 136.

Fixed disk 45 also includes image files 137, other files 138, color descriptor data structures 139 for implementing the present invention as described further herein, color target measurement data 140 which represents color image data obtained from a color target, device model program 141 which is used to generate color characteristics of color device, and color management module 142 which is used to render source image color data for reproduction on a destination output device, such as printer 50. Color descriptor data structures 139 of the present invention are preferably generated by computer-executable process steps which are stored on fixed disk 45 for execution by CPU 113, such as in one of application programs 131 or in color management module (CMM) 142. The process steps for generating color descriptor data structures 139 of the present invention are described in more detail below.

Figure 3:
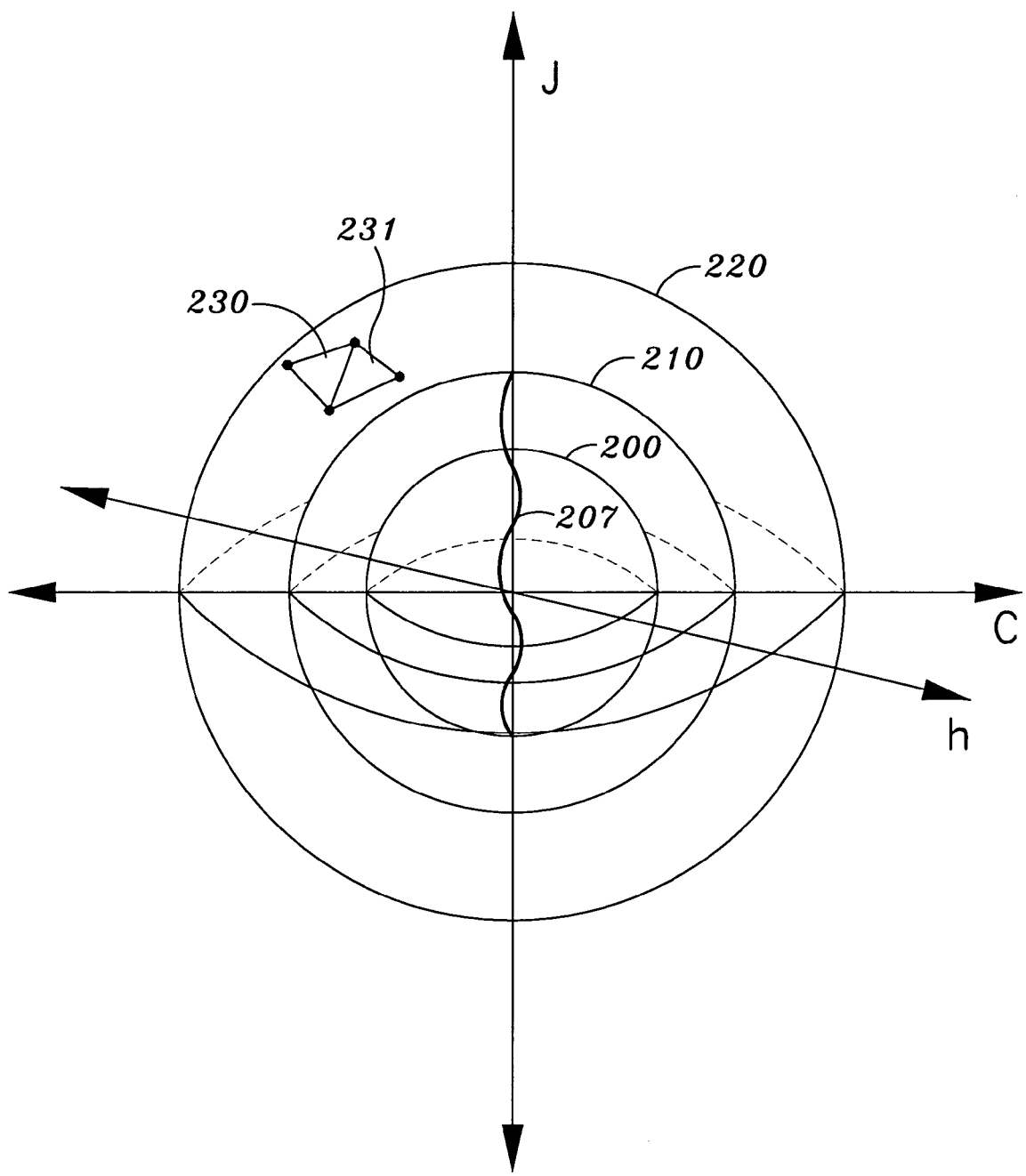
FIG. 3 is a diagram which depicts the boundary regions for a color device in three-dimensions according to one embodiment of the invention.

FIG. 3 is a three-dimensional depiction of three color boundary descriptor regions corresponding to a color device as represented by respective color boundary descriptor shells provided in a color descriptor data structure according to the present invention. As seen in FIG. 3, the outer shell of each color boundary descriptor region is represented by a three-dimensional convex shell in JCh color space. The innermost color boundary descriptor region shown in the example of FIG. 3 is reference boundary descriptor region 200, which represents the reference colors of the color device which are based on measured colors from a reference color target. For example, when obtaining measurement data for output devices, such as printers, a user prints a test target from the printer wherein the test target contains color patches that cover the gamut of colors that the device can produce. In such a case, control values in CMYK color space for the range of 0 to 255 are input to the printer and the range of colors that the printer is capable of producing are output onto the test target. Then, the output test target is measured with a calorimeter or a spectrometer to obtain output color measurements.

A profiling tool can then be used to create a color device file containing the control values and the output values. A device manufacturer may perform this process and then provide the color device file to purchasers and users of its color devices. It should be appreciated that for output devices, such as printers, the reference boundary region described by the output colors on the measured test target is the same as the plausible boundary region of colors that can be produced by the color device. The possible boundary region described by the full range of control values may be larger than the reference boundary region if the encoding scheme being used contains headroom and footroom color values that are beyond the range of colors that the color device can produce. For example, if the 8-bit CMYK encoding space is used then the range of possible colors in the encoding space is usually around the same as the range of reference colors that were output by the color device. However, if a larger 16-bit scRGB encoding scheme is used, then the range of possible colors in the encoding space is usually much larger than the range of reference colors that were output by the color device.

When obtaining measurement color data for input devices, a pre-printed standardized target is generally used, such as an IT8-7.2 target, a MacBeth ColorChecker target, or a ColorCheckerDC target. The IT8 target contains approximately 260 color patches printed on photographic paper, and the ColorChecker is a physical target containing dyed color patches. Control measurement data for the pre-printed standardized target is usually provided by the manufacturer of the target. The user then uses the input device, such as a camera, to capture the color patches on the pre-printed standardized target. The color data for the captured target provides the device color values corresponding to the control measurement values of the target. A profiling tool can then be used to create a color device file containing the control measurement values and the captured device values. The pre-printed standardized target typically does not have color patches which cover the entire range of colors that the input device can produce. For this reason, the reference boundary region which represents the captured color values is usually smaller than the plausible boundary region which represents the range of colors that the device can produce. If the input color device is characterized based only on the narrow range of measured reference color values from the captured color target, then it would be difficult to manage colors from the input color device that are outside the narrow range of measured reference colors but still within the range of colors that can plausibly be produced by the color device.

In this regard, the color descriptor data structure of the present invention also includes plausible color descriptor data corresponding to the plausible colors which can be reasonably reproduced by the color device. Plausible boundary descriptor region 210 represents the region described by the plausible color descriptor data. By definition, plausible boundary descriptor region 210 includes at least the colors of reference boundary descriptor region 200. Accordingly, as described above, the colors which can be reproduced by the color device but which are outside the range of measured reference colors from the device's reference color target will fall between reference boundary descriptor region 200 and plausible boundary descriptor region 210.

The outermost boundary descriptor region is possible boundary descriptor region 220 which corresponds to the full range of color values that are described by the color encoding scheme being used. Accordingly, possible boundary descriptor region 220 will usually include colors beyond the range of colors that can be reasonably reproduced by the color device. For example, a new IEC standard color encoding scheme known as "scRGB", (IEC 61966-2-2), provides sixteen (16) bits for each of the three color channels red, green, and blue (RGB). In that encoding scheme, reference black is not encoded as the RGB triple (0, 0, 0), but as (4096, 4096, 4096), and the reference white is encoded as (12288, 12288, 12288). Therefore, the scRGB encoding scheme contains a lot of unused headroom and footroom since the maximum value of the 16 bit range is (65,535, 65,535, 65,535). This can be used to represent specular highlights and shadow detail beyond the reference white and reference black of the scheme. The range of color values of the scRGB encoding scheme includes RGB triples that are not physically possible because they would require negative amounts of light. Accordingly, no device can possibly produce all the colors in the scRGB color gamut. The present invention uses plausible boundary descriptor region 210 to utilize the additional headroom and footroom of the color encoding scheme to describe this colors which can be reproduced by the color device but which are not within the range of the color device's reference colors of reference boundary descriptor region 200.

Because possible boundary descriptor region 220 represents the full range of the encoding scheme, it necessarily includes the colors of plausible boundary descriptor region 210 and the colors of reference boundary descriptor region 207. It should be appreciated that there are circumstances when the three boundary descriptor regions described above will be collapsed on top of each other. For example, when the full range of values of the encoding scheme is utilized to depict the full range of colors that can be reproduced by the color device, then possible boundary descriptor region 220 will collapse onto plausible boundary descriptor region 210.

Similarly, when the measured reference color values include the full range of colors that can be reproduced by the color device, then plausible boundary descriptor region 210 will collapse onto reference boundary descriptor region 200. Possible boundary descriptor region 220 can be represented by possible boundary descriptor data optionally included in a color descriptor data structure according to the invention. The inclusion of the possible boundary descriptor data is optional because the range of values of the particular color encoding scheme in use is generally known when performing color management of color image data.

Also included in FIG. 3 is neutral color tone spline 207 which represents the neutral gray colors of the color device. It should be noted that neutral color tone spline 207 does not have to be a straight line because the neutral gray colors of the color device do not necessarily fall on the J axis in the color appearance space, where chroma (C) is equal to zero. Neutral color tone spline 207 is based on neutral color data in the color descriptor data structure, which preferably includes data representing at least five colors which are: (1) the whitest-white color that the color device can produce, corresponding to a specular highlight in an image; (2) a reference white color producible by the color device, corresponding to a diffuse white color in an image; (3) a neutral mid-gray color producible by the color device, corresponding to a mid-tone gray color in an image; (4) a reference black color that the color device can produce, corresponding to a shadow black in an image; and (5) the blackest-black color that the color device can produce, corresponding to a completely black color without detail in an image. In this manner, the neutral color data provided in the color descriptor data structure allows color image data to be correctly mapped to the neutral gray tone spline of an output device, thereby resulting in an appropriate tonal appearance of the output image from the output device.

As mentioned above, each boundary descriptor region shown in FIG. 3 is represented as a three-dimensional convex shell in JCh color space. The boundary descriptor data for each boundary descriptor region contained in the color descriptor data structure according to the present invention therefore is arranged to collectively represent a three-dimensional convex shell. There are many known methods for arranging data to depict three-dimensional surfaces. In one embodiment of the invention, the data is arranged in vertex sets wherein each vertex set represents a two-dimensional polygon surface, such as a triangle. As seen in FIG. 3, two-dimensional triangles 230 and 231 each of which is defined by a set of three vertices. Accordingly, in this embodiment, the boundary descriptor data contained in the color descriptor data structure is arranged in sets of three vertices, where each vertex is described by a JCh value in color appearance space. The format of the boundary descriptor data of this embodiment is described more fully below with reference to FIG. 5B.

Figure 4:
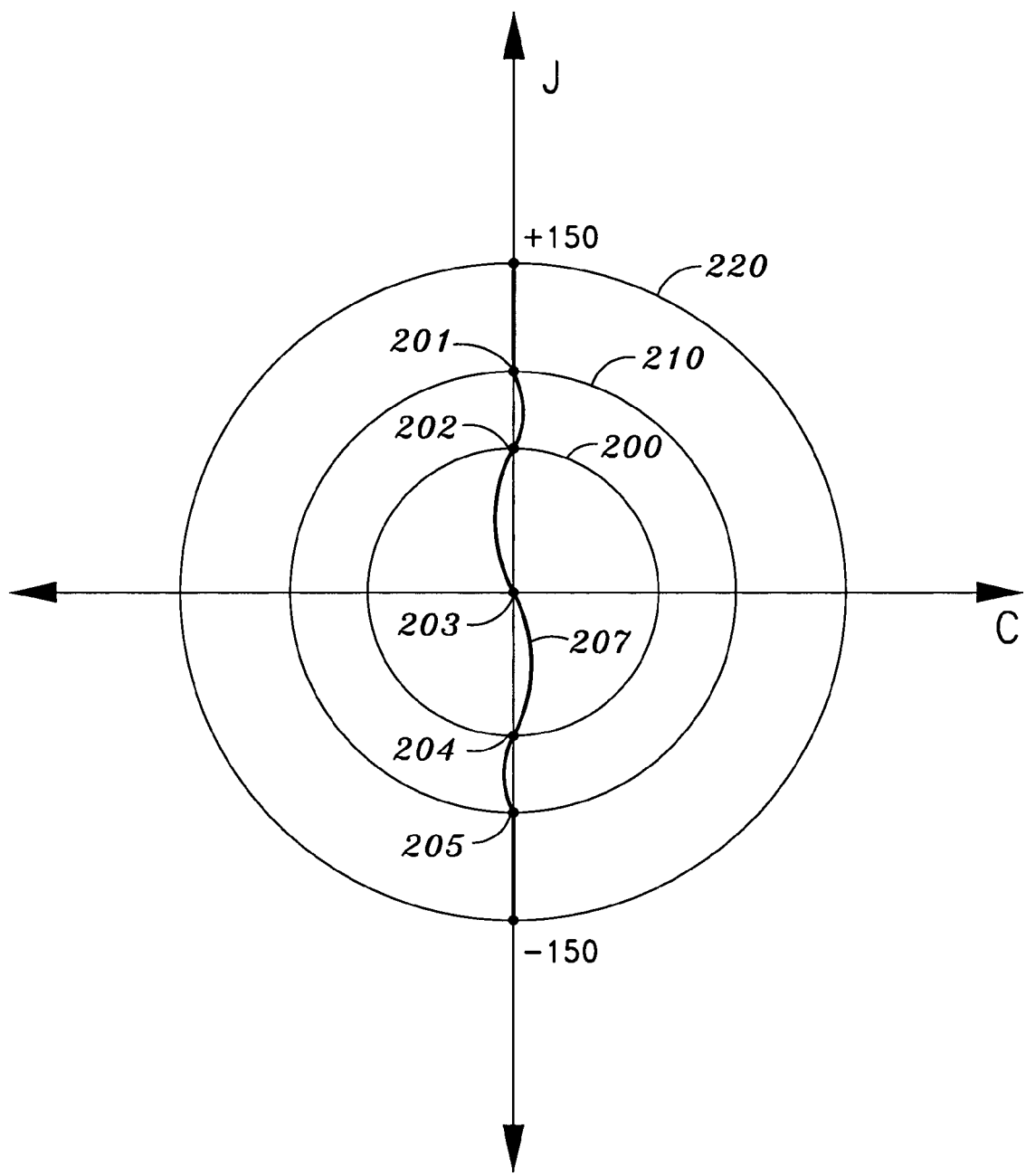
FIG. 4 is a diagram which depicts the boundary regions for a color device in two-dimensions according to one embodiment of the invention.

Turning to FIG. 4, a two-dimensional cross-section is shown of the boundary descriptor regions depicted in FIG. 3. As seen in FIG. 4, cross-sections of reference boundary descriptor region 200, plausible boundary descriptor region 210, and possible boundary descriptor region 220 are represented, as well as neutral color tone spline 207. The boundary descriptor regions of the present invention allow the color characteristics of a color device to be depicted in color appearance space beyond the range allowed by the conventions of a standardized reference color profile. For example, neutral color tone spline 207 can be shifted so that plausible boundary descriptor region 210 includes colors with lightness (J) values above the value of 100, such as specular highlights of an image, and below 0, such as black without detail. As depicted in FIG. 4, neutral color tone spline 207 is defined by the five neutral color points described above. Specifically, neutral color tone spline 207 includes whitest-white color 201, reference white color 202, neutral mid-gray color 203, reference black color 204, and blackest-black color 205. These neutral color points correspond to neutral color data provided in the color descriptor data structure of the present invention.

The color space disposed between whitest-white color 201 and reference white color 202 includes image colors that range between diffuse white and specular white. Similarly, the color space disposed between reference black color 204 and blackest-black color 205 includes image colors that range between shadow black and black without detail. The use of these interim spaces between the aforementioned neutral gray color points allows the specular highlights and shadow blacks to be preserved when mapping the image color data to the color space and gamut of an output medium. These interim spaces between the neutral gray colors can vary depending on the characterization of the color device as represented by reference boundary descriptor region 200 and plausible boundary descriptor region 210. For instance, if plausible boundary descriptor region 210 is collapsed onto reference boundary descriptor region 200, which is the case when the reference color data contains the full range of colors that can be produced by the color device, then whitest-white color 201 and reference white color 202 can be co-located on the same point in color space, and reference black color 204 and blackest-black color 205 can be co-located on the same point in color space. In such a situation, mapping of color image data using the boundary descriptor regions would result in the loss of specular highlights between diffuse white and specular white, and the loss of shadow blacks between black with detail and black without detail.

Of course, the present invention allows for flexibility in the characterization of a color device because the neutral color data provided in the color descriptor data structure corresponding to the color device can be manipulated to modify the shape and placement of neutral color tone spline 207 in the color appearance space. So, even in the above example where plausible boundary descriptor region 210 is collapsed onto reference boundary descriptor region 200, the position of reference white color 202 can be moved down the J axis to provide separation from whitest-white color 201, and the position of reference black color 204 can be moved up the J axis to provide separation from blackest-black color 205. This ability to manipulate the neutral color data in the color descriptor data structure for the color device allows a user or developer to control the mapping of color image data so as to preserve image colors, such as specular highlights and shadow blacks, when the color image data is reproduced on an output medium, such as printer paper in a color printer. Accordingly, the present invention has the advantage over conventional, predetermined color profile formats in which generally do not provide a readily-usable distinction between reference colors for a color device and the full range of colors that a device can plausibly reproduce, and which do not allow for convenient identification and manipulation of the gray color points for the color device.

Figure 5A:
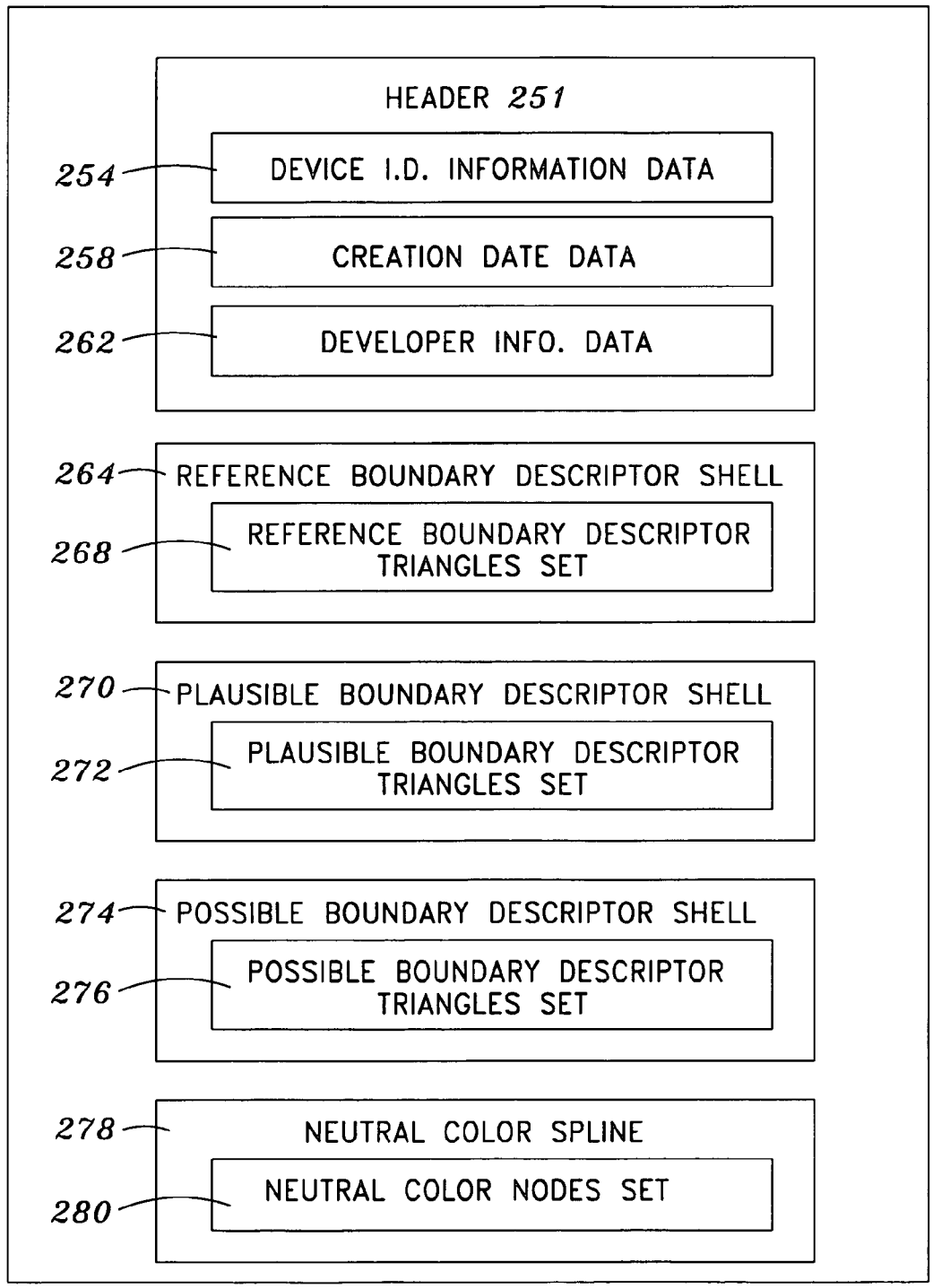
FIG. 5A is a diagram which depicts a color descriptor data structure according to one embodiment of the invention.

FIG. 5A represents an example of one of color descriptor data structures 139 according to the present invention. As seen in FIG. 5, color descriptor data structure 250 includes a variety data structures, most of which are used to describe the outer surface of each boundary descriptor region corresponding to the color device. Specifically, color descriptor data structure 250 includes header 251 which contains data representing identification of the corresponding color device, as well as information regarding the creation of color descriptor data structure 250. In particular, header 251 includes within it device i.d. information data 254 which represents an identifier for the corresponding color device, such as the device manufacturer and/or model name, or other such identifying information. Creation date data 258 is also provided in header 251 and represents the date on which the information in color descriptor data structure 250 was created or last modified, thereby allowing a user to know if color descriptor data structure 250 reflects the current color characteristics of the corresponding color device. Developer information data 262 is provided in header 251 and represents the identity of the person or entity which prepared and developed color descriptor data structure 250.

Also included in color descriptor data structure 250 are reference boundary descriptor shell 264, plausible boundary descriptor shell 270, possible boundary descriptor shell 274, and neutral color spline 278. Each of the aforementioned boundary descriptor shells in color descriptor data structure 250 represents a corresponding boundary descriptor region outer shell depicted in FIG. 3. In this regard, each boundary descriptor shell is comprised of many two-dimensional polygon triangle surfaces. So, as seen in FIG. 5A, reference boundary descriptor shell 264 includes reference boundary descriptor triangles set 268, plausible boundary descriptor shell 270 includes plausible boundary descriptor triangles set 272, and possible boundary descriptor shell 274 includes possible boundary descriptor triangles set 276. Each of the aforementioned triangles sets contain multiple vertex sets that are used to define the triangles of the outer shell of the respective boundary descriptor. Also included in color descriptor data structure 250 is neutral color spline 278 which includes neutral color nodes set 280. Neutral color nodes set 280 includes multiple data points in color appearance space representing neutral gray colors of the corresponding color device, ranging from the whitest-white color to the blackest-black color that can be produced by the device. Preferably, the neutral gray colors represented by neutral color nodes set 280 includes the five neutral gray colors of a whitest-white color, a reference-white color, a mid-tone gray color, a reference-black color, and a blackest-black color In this manner, neutral color nodes set 280 is used in the present invention to depict neutral color tone spline 207 as described above with respect to FIGS. 3 and 4. Accordingly, color descriptor data structure 250 contains the necessary information to describe the three boundary descriptor regions of the corresponding color device, as well as the spline of neutral gray colors of the color device. The aforementioned boundary descriptor regions and neutral gray spline are then used to properly map to and from the color space and color gamut of corresponding color device during a color management process.

Figure 5B:
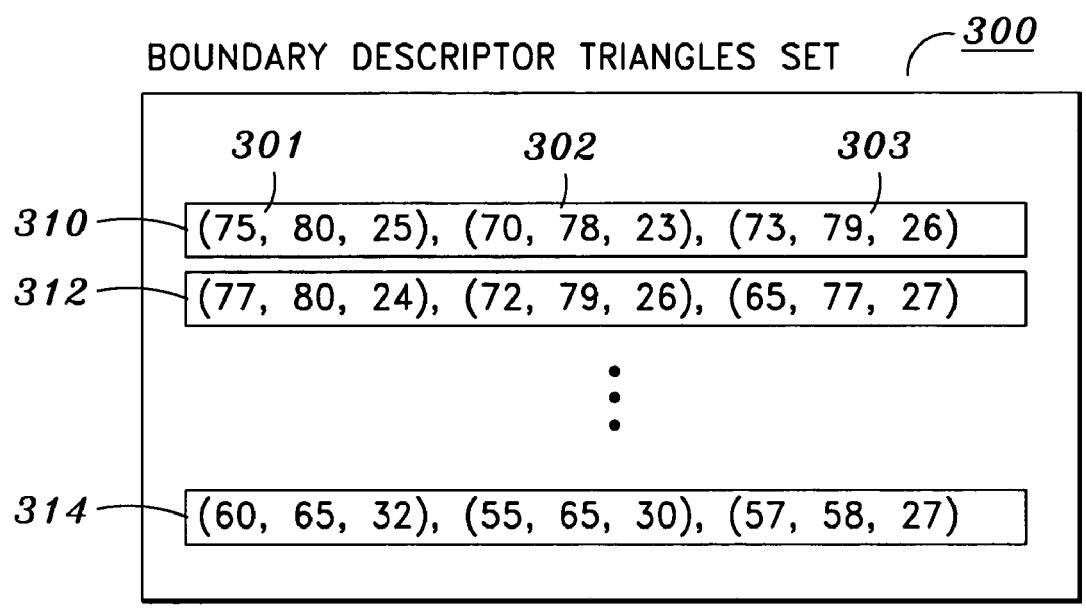
FIG. 5B is a diagram which depicts a data format for a color descriptor data structure according to one embodiment of the invention.

FIG. 5B depicts a format for boundary descriptor triangles sets 268, 272 and 276 in color descriptor data structure 250 of FIG. 5A, which combine to form the outer shell of each of the boundary descriptor regions of the corresponding color device. As discussed above, the low-level data for representing the outer shell of each boundary descriptor region is preferably formatted into many vertex sets, wherein each vertex set contains color appearance space values for three vertices, thereby representing a two-dimensional polygon surface, which in this case is a triangle. In this manner, all vertex sets of a boundary descriptor triangles set are combined to represent a mosaic-like, three-dimensional convex hull surface of the corresponding boundary descriptor region. Returning to FIG. 5B, it can be seen that the data of boundary descriptor triangles set 300 is arranged into a series of vertex sets 310 to 314, each vertex set containing color appearance space (JCh) values for three vertices 301 to 303. For example, as seen in vertex set 310, vertex 301 contains a "J" value of 75, a "C" value of 80, and an "h" value of 25. These three values define a particular vertex point in JCh color appearance space, such as one of the three vertex points of two-dimensional triangle 230 in FIG. 3. Accordingly, each of vertex sets 310 to 314 represents a two-dimensional triangle which is a piece of the overall three-dimensional convex hull surface of the corresponding boundary descriptor region, such as plausible boundary descriptor region 210 in FIG. 3.

Of course, it can be appreciated that there are many known methods for representing a three-dimensional surface, and that the present invention may use such methods in the alternative without departing from the functionality and spirit of the invention. For example, the boundary descriptor triangles sets of each shell in color descriptor data structure 250 can be formatted so that they represent indexed triangles in which all vertices are stored along with the connection lines between vertices. Another method would be to format the data in the boundary descriptor triangles sets to represent triangle strips, which when combined represent the three-dimensional surface of the corresponding boundary descriptor region. As mentioned above, neutral color nodes set 280 is simply a collection of vertex points which represent the neutral gray colors of neutral color tone spline 207. Accordingly, a user or developer can easily access the neutral gray colors of neutral color nodes set 280 in color descriptor data structure 250, in order to identify and even modify the range of tones that are used to characterize the corresponding color device by changing the values for the neutral colors in neutral color nodes set 280. Preferably, each set of JCh values in neutral color nodes set 280 has a corresponding set of semantic data, such as a character string which contains the name of the specific neutral gray color. The semantic data can then be easily identified by a user or developer when accessing neutral color nodes set 280, so that the user or developer can more easily read the color appearance space values for each neutral gray color and modify the values if desired.

Figure 6:
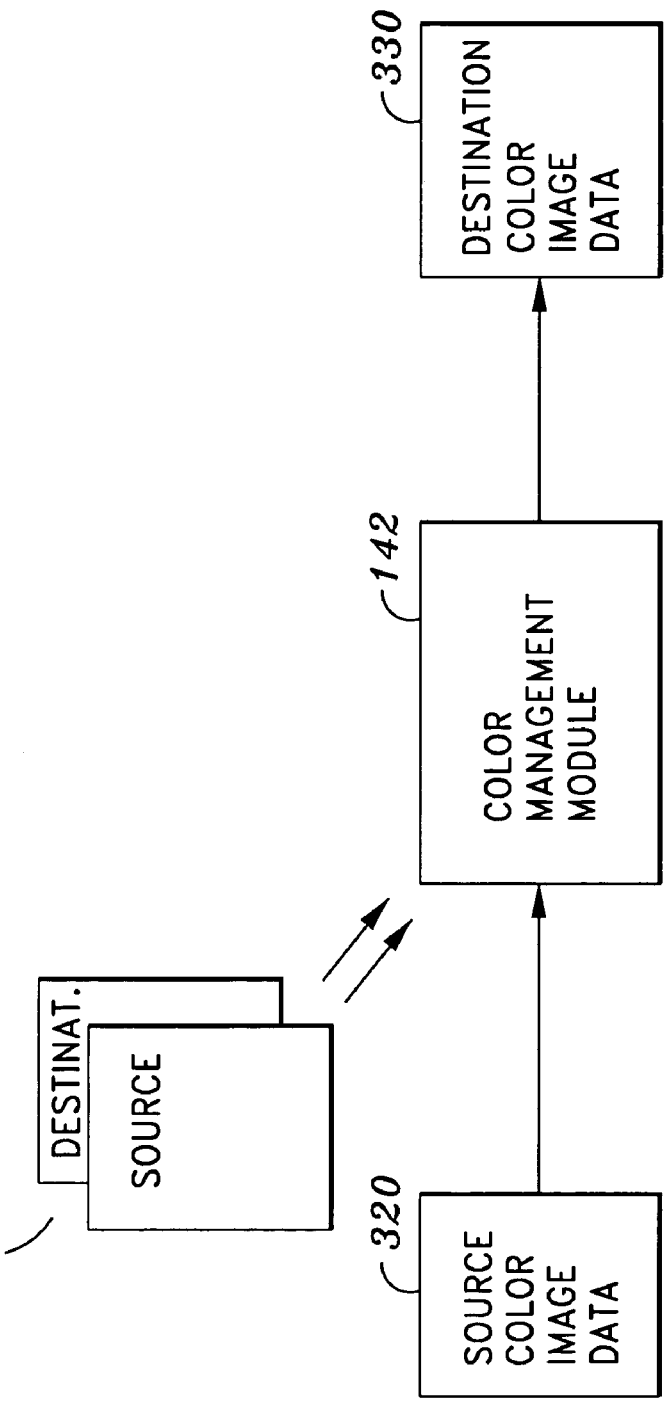
FIG. 6 is a diagram which depicts a color management process using a color descriptor data structure according to one embodiment of the invention.

FIG. 6 depicts a color management process using color descriptor data structures 139 of the present invention. As seen in FIG. 6, color management module 142 accesses two of color descriptor data structures 139 corresponding to a source color device which generated source color image data 320, and to a destination color device which will reproduce the color image data on an output medium. In particular, color management module 142 preferably accesses color descriptor data structures 139 and retrieves the descriptor data for the boundary descriptor regions and neutral color tone splines of each device. Color management module 142 then preferably uses this information to derive matrices and look-up tables to properly map the colors of source color image data into the desired areas of the boundary descriptor regions and neutral color tone spline of the destination color device, thereby generating destination color image data 330. Accordingly, color descriptor data structures 139 of the present invention can be used to achieve a more accurate and desirable reproduction of color image data.

Figure 7:
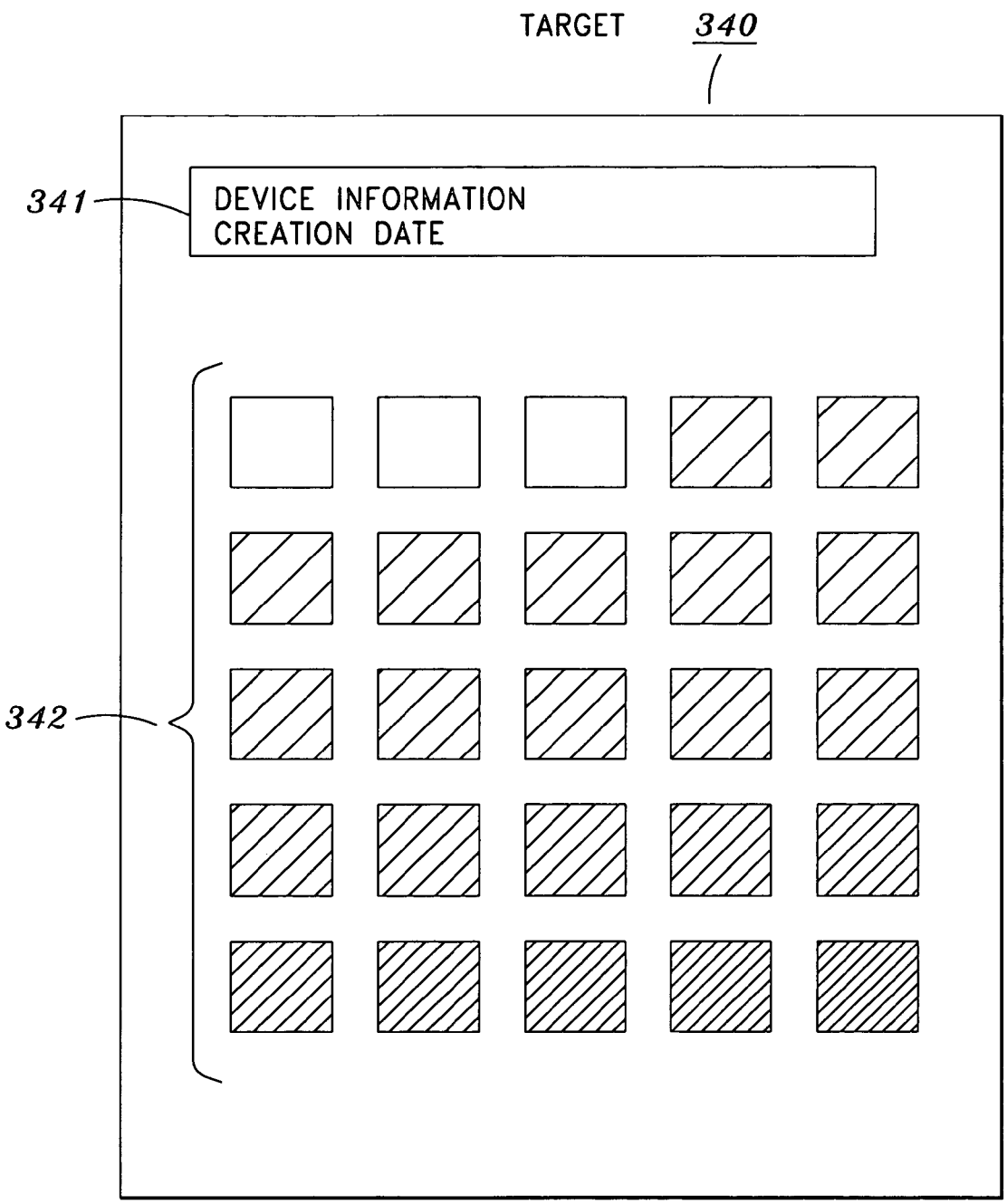
FIG. 7 is a diagram for depicting a color target reference used to create a color descriptor data structure according to one embodiment of the invention.

FIG. 7 depicts a standardized, pre-printed reference color target used to obtain measured reference color data which can be used to create reference boundary descriptor triangles set 268 for an input color device according to one embodiment of the invention. As seen in FIG. 7, target 340 is a provided on a printed medium, such as photographic paper, although other types of media, such as transparencies can be used as well. Target 340 contains information field 341 and color patch field 342. Preferably, target 340 is a predetermined, standardized color target. For example, target 340 can be formatted according to an IT8-7.2 standard target, a MacBeth ColorChecker standard target, or a ColorCheckerDC standard target. Information field 341 preferably contains data corresponding to device information regarding the device which generated the color target, such as target type and manufacturer, as well as information for the creation date of target 340. Color patch field 342 of target 340 contains a range of color patches representing standard reference colors. As mentioned above, the reference colors represented by the color patches typically do not include the full range of colors that the input color device capturing the target is capable of producing. Target 340 is captured to obtain measured reference color values corresponding to each of the color patches in color patch field 342 which can then be used to generate reference boundary descriptor triangles set 268 for placement in a color descriptor data structure for the input color device.

Figure 8:
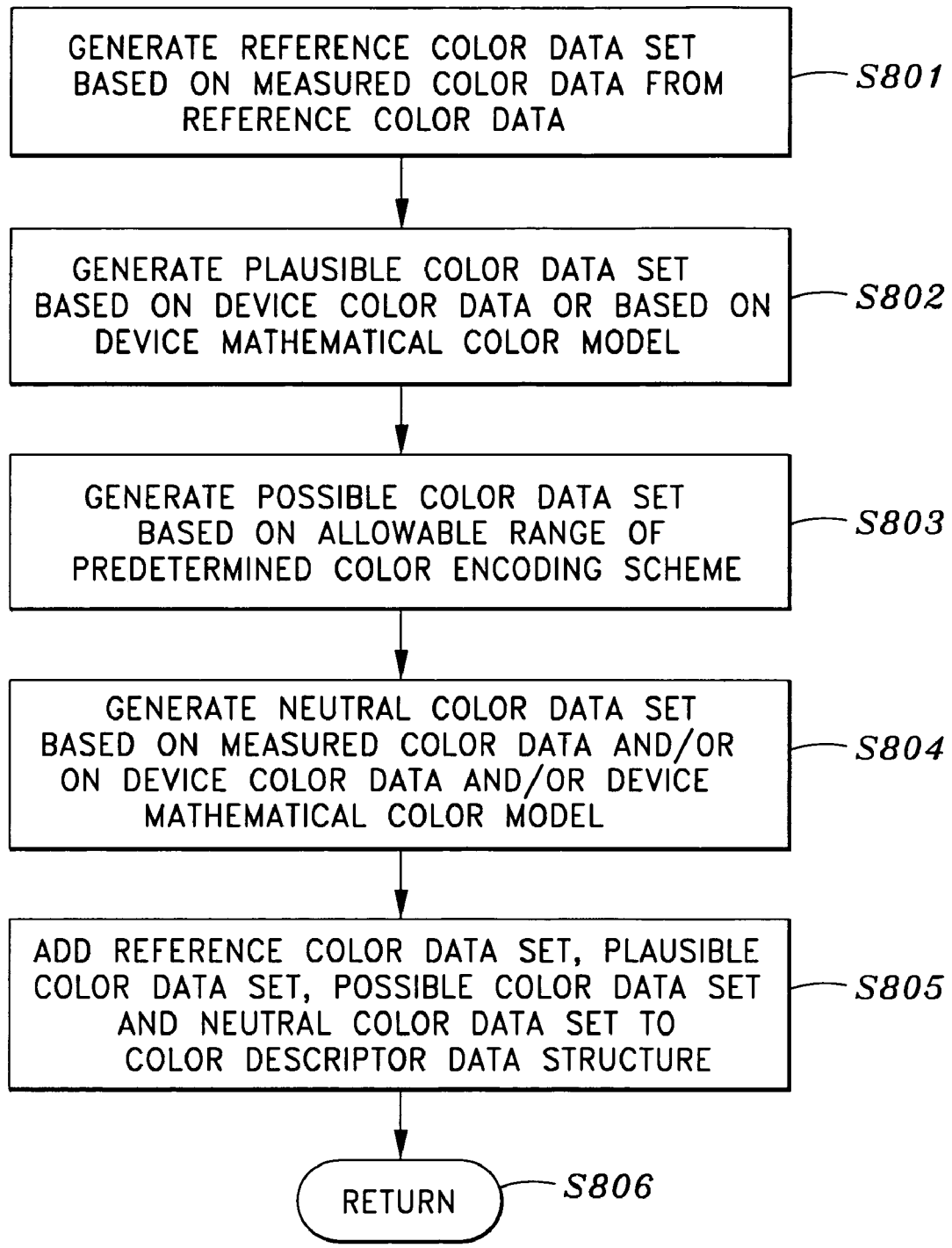
FIG. 8 is a flow chart for explaining a process to create a color descriptor data structure according to one embodiment of the invention.

FIG. 8 is a flowchart for describing the process of creating a color descriptor data structure according to one embodiment of the present invention. In step S801, reference color data is generated based on measured reference color data from a reference color target. For example, the measured reference color data can be obtained from a manufacturer of a color device where the manufacturer has scanned a reference color target corresponding to the color device to generate the measured reference color data. In the alternative, the measured reference color data can be obtained directly by obtaining the reference color target and then scanning it. In another alternative, the measured reference color data can be obtained from a mathematical model of the color device, such as device model program 141 which is configured to predict the color characteristics of the color device.

Next, in step S802, plausible color data is generated based on device color data obtained from the manufacturer of the color device, where the device color data represents the range of colors that can be reproduced by the color device. In the alternative, the plausible color data can be generated based on a mathematical model corresponding to the color device such as device model program 141 which is configured to predict the full range of color characteristics of the color device. For example, device model program 141 can be configured based on the measured reference color data, and then extrapolates to generate the full range of colors that can be reproduced by the color device. In step S803, possible color data is generated based on the complete allowable range of the predetermined encoding scheme being used to represent color data. For example, if an 8-bit RGB encoding scheme is being used, then the range of all colors represented by the RGB values from (0, 0, 0) to (255, 255, 255) are used and translated into JCh color appearance to generate the possible color data.

In step S804, neutral color data is generated based on one or more of the measured reference color data, the device color data obtained from the manufacturer, or a mathematical device color model, such as device model program 141. Specifically, values for the device's neutral gray colors ranging from whitest-white to blackest-black are obtained from one of the aforementioned sources, and then converted to color appearance space to generate the neutral color data. The reference color data, the plausible color data, and the possible color data are placed into formatted triangles sets in the color data descriptor structure in step S805, as depicted in FIG. 5A, so as to represent the outer shell of each respective boundary descriptor region. The process ends at "return" in step S806.

The boundary descriptor regions described in the color descriptor data structures discussed above are used in the present invention during a color management process to more accurately map color image data from source boundary descriptor regions to destination boundary descriptor regions, based on the shape and positions of the respective boundary descriptor regions. For example, a source color descriptor data structure may describe three separate boundary descriptor regions for a source device and a destination color descriptor data structure may describe three separate boundary descriptor regions for a destination device. On the other hand, one or both of the color descriptor data structures may describe boundary descriptor regions which are actually collapsed onto the reference boundary descriptor region, such as when the reference colors used to create the reference boundary descriptor region contain the full range of plausible colors that can be produced by the corresponding color device. Accordingly, the present invention maps color image data between source boundary descriptor regions and destination boundary descriptor regions, based on the combination of types of boundary descriptor regions described by the respective source and destination color descriptor data structures.

Figure 9:
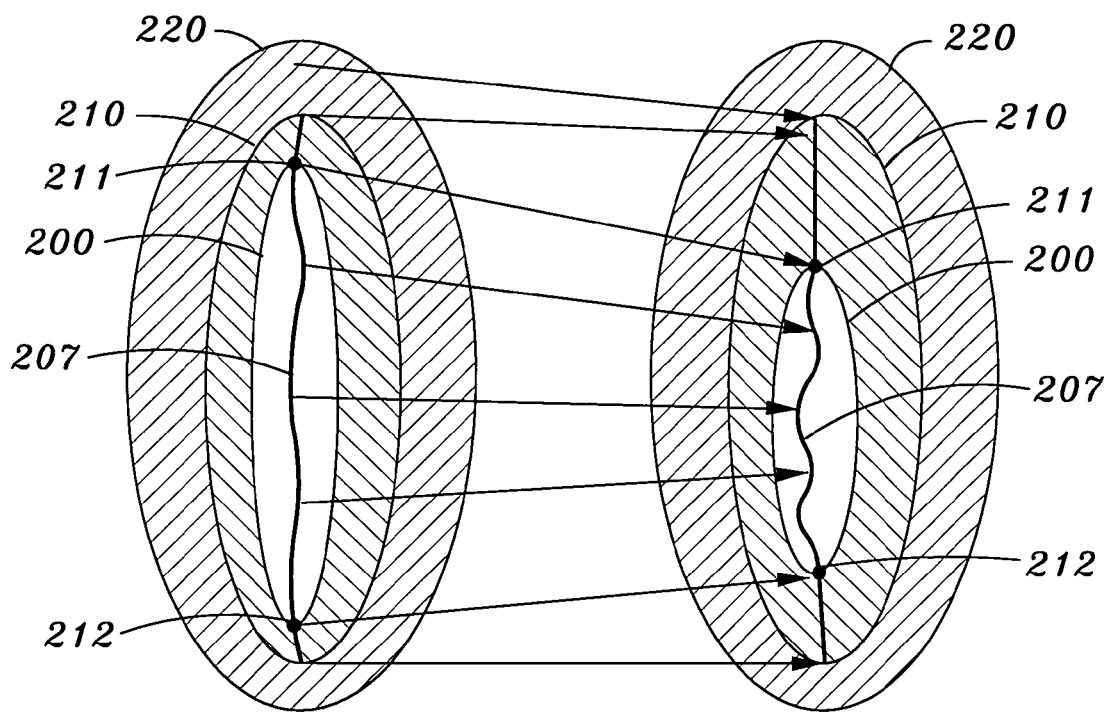
FIG. 9 is a diagram depicting a mapping of colors from multiple source boundary descriptor regions to multiple destination boundary descriptor regions according to one embodiment of the invention.

In this regard, FIG. 9 depicts the mapping of colors from multiple source boundary descriptor regions to multiple destination boundary descriptor regions according to one embodiment of the invention. As seen in FIG. 9, multiple source boundary descriptor regions are provided which correspond to a source device which captured the source image data, and multiple destination boundary descriptor regions are provided which correspond to a destination device which is intended to reproduce the source image data on an output medium. The multiple source boundary descriptor regions in FIG. 9 include reference boundary descriptor region 200, plausible boundary descriptor region 210 and possible boundary descriptor region 220, each of which were described in detail above. Similarly, the multiple destination boundary descriptor regions in FIG. 9 also include reference boundary descriptor region 200, plausible boundary descriptor region 210 and possible boundary descriptor region 220, although not necessarily of the same relative shapes, sizes and positions as those of the source boundary descriptor regions. When mapping source color image data for reproduction by the destination device, it is desirable to utilize the plausible range of colors that the destination device can produce in order to achieve a better color image.

Accordingly, FIG. 9 depicts a situation in which both the source and destination color descriptor data structures describe multiple, separately spaced boundary regions, hereinafter referred to as "uncollapsed" boundary descriptor regions. As seen in FIG. 9, a color mapping scheme is depicted in which the colors located in source possible boundary descriptor region 220 but which are outside of source plausible boundary descriptor region 210 are mapped to the outer boundary of destination plausible boundary descriptor region 210. In this way, colors that are outside the plausible color production range of the source device are clipped to the outer limits of the plausible color production range of the destination device. Similarly, colors located in source plausible boundary descriptor region 210 but which are outside of source reference boundary descriptor region 200 are mapped to an area in destination plausible boundary descriptor region 210 but outside of destination reference boundary descriptor region 200. In this way, colors that are within the plausible color production range of the source device, but not within the source reference color range, are mapped to be within an area of the plausible color production range of the destination device which is outside the destination reference color range. So specular highlights, shadow blacks, and saturated colors can be properly reproduced on the output medium by the destination device.

As further seen in the scenario depicted in FIG. 9, all colors within source reference boundary descriptor region 200 are mapped to be within destination reference boundary descriptor region 200. Finally, the gray color points of source neutral color tone spline 207 are mapped to destination neutral color tone spline 207. For example, the source whitest-white color and source blackest-black color are mapped from the outer edges of source plausible boundary descriptor region 210 to the destination whitest-white color and destination blackest-black color at the outer edges of destination plausible boundary descriptor region 210. Similarly, source reference-white color 211 and source reference-black color (shadow black) 212 are mapped from the outer edges of source reference boundary descriptor region 200 to the destination reference-white color 211 and destination reference-black color (shadow black) 212 at the outer edges of destination reference boundary descriptor region 200. As discussed above, reference-white color 211 and reference-black color 212 do not always fall on the outer edges of the reference boundary descriptor region, and may be located inside the reference boundary descriptor region along the neutral color tone spline, depending on the descriptor data in the corresponding color descriptor data structure and the rendering intent of the user or developer. Accordingly, the foregoing color mapping technique takes full advantage of the multiple "uncollapsed" boundary descriptor regions for each of the source and destination devices in order to achieve a more accurate and desired reproduced image on the output medium.

Figure 10:
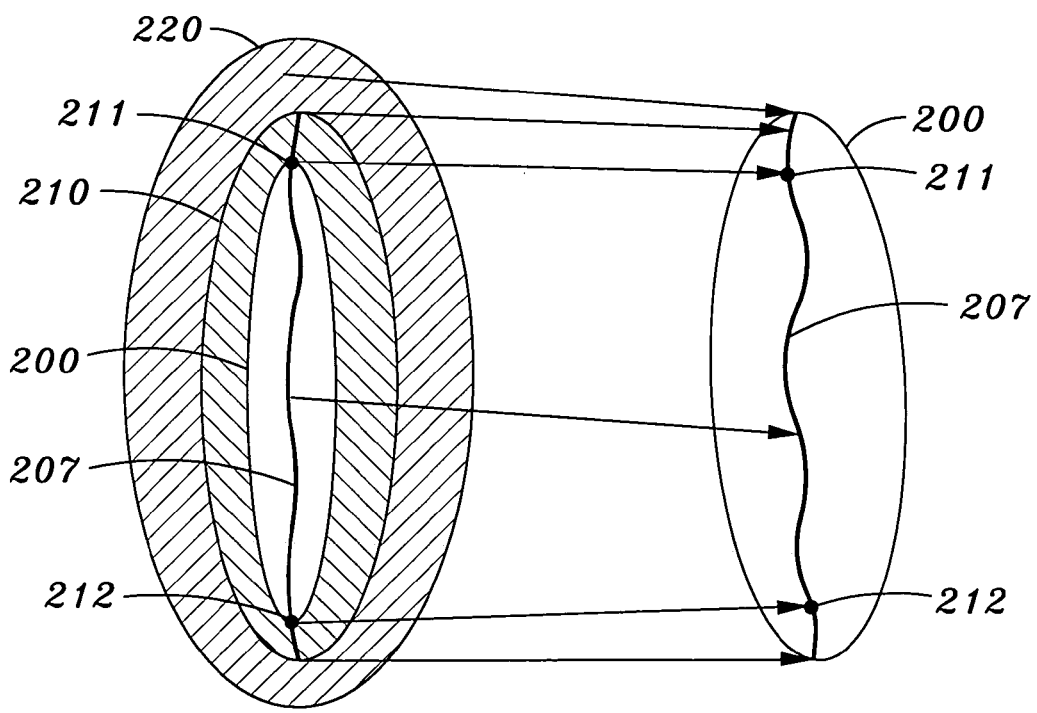
FIG. 10 is a diagram depicting a mapping of colors from multiple source boundary descriptor regions to a single destination boundary descriptor region according to one embodiment of the invention.

FIG. 10 depicts a scenario in which only the source color descriptor data structure describes multiple, separately-spaced ("uncollapsed") boundary regions, and in which the destination color descriptor data structure describes boundary regions which are collapsed onto the single space of the destination reference boundary descriptor region 200. As seen in FIG. 10, a color mapping scheme is depicted in which the colors located in source possible boundary descriptor region 220 but which are outside of source plausible boundary descriptor region 210 are mapped to the outer boundary of destination reference boundary descriptor region 200. In this way, colors that are outside the plausible color production range of the source device are clipped to the outer limits of the reference color production range of the destination device, since this is the only known boundary descriptor region for the destination device. Similarly, colors located in source plausible boundary descriptor region 210 but which are outside of source reference boundary descriptor region 200 are mapped to an area within destination reference boundary descriptor region 200 which is between destination reference-white color 211 and destination reference-black color 212 and the outer boundary of destination reference boundary descriptor region 200. In this way, colors that are within the plausible color production range of the source device, but not within the source reference color range, are mapped to an area within the destination reference color range. So specular highlights, shadow blacks, and saturated colors can still be properly reproduced on the output medium by the destination device, even though only the destination reference boundary descriptor region is known for the destination device.

As further seen in the scenario depicted in FIG. 10, all colors within source reference boundary descriptor region 200 are mapped to be within an area of destination reference boundary descriptor region 200 which is located inside of destination reference-white color 211 and destination reference-black color 212. Finally, the gray color points of source neutral color tone spline 207 are mapped to destination neutral color tone spline 207. For example, the source whitest-white color and source blackest-black color are mapped from the outer edges of source plausible boundary descriptor region 200 to the destination whitest-white color and destination blackest-black color at the outer edges of destination reference boundary descriptor region 200. In this scenario, source reference-white color 211 and source reference-black color 212 are mapped from the outer edges of source reference boundary descriptor region 200 to destination reference-white color 211 and destination reference-black color 212 which are located inside of the outer edges of destination reference boundary descriptor region 200. In this manner, reference-white color 211 and reference-black color 212 are located inside "collapsed" destination reference boundary descriptor region 200 along the neutral color tone spline, so as to utilize the full known range of the destination reference colors to include specular highlight colors, shadow black colors and saturated colors from the source color image data. Accordingly, the foregoing color mapping technique accommodates the scenario in which the color descriptor data structure for the source device has multiple, "uncollapsed" boundary descriptor regions, but the color descriptor data structure for the destination device has single-spaced, "collapsed" boundary descriptor regions, while still achieving a more accurate and desired reproduced image on the output medium.

Figure 11:
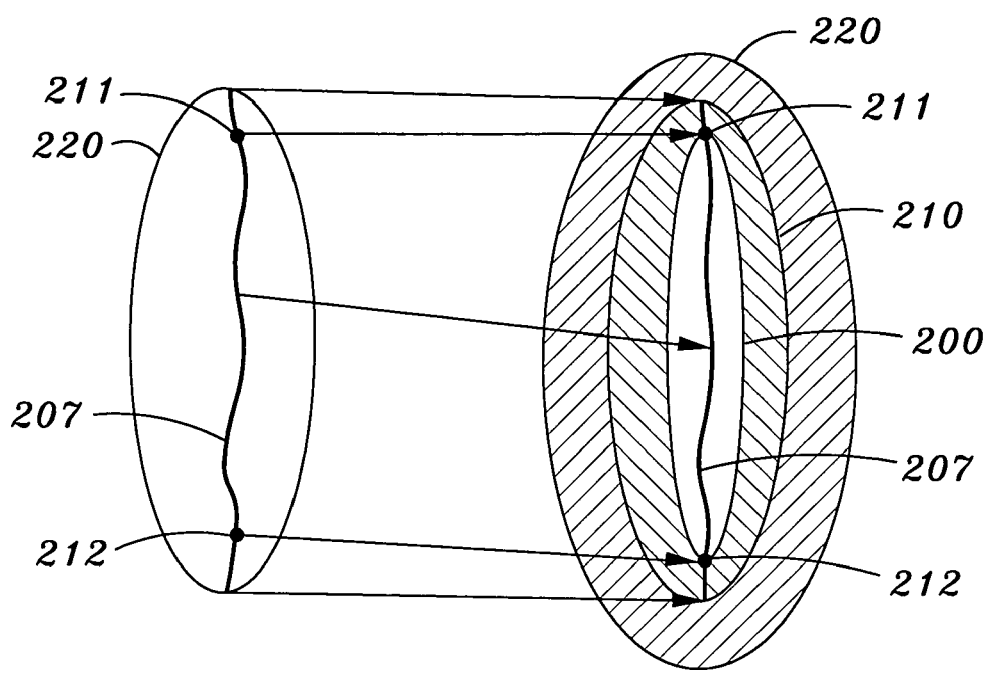
FIG. 11 is a diagram depicting a mapping of colors from a single source boundary descriptor region to multiple destination boundary descriptor regions according to one embodiment of the invention.

FIG. 11 depicts a scenario in which only the destination color descriptor data structure describes multiple, separately-spaced ("uncollapsed") boundary regions, and in which the source color descriptor data structure describes boundary regions which are collapsed onto the single space of source reference boundary descriptor region 200. As seen in FIG. 11, a color mapping scheme is depicted in which colors in an area of source reference boundary descriptor region 200 which is located from source reference-white color 211 and source reference-black color 212 to the outer edge of source reference boundary descriptor region 200, are mapped to be between the outer edge of destination plausible boundary descriptor region 210 and the outer edge of destination reference boundary descriptor region 200. Similarly, colors located between source reference-white color 211 and source reference-black color 212 in source reference boundary descriptor region 200 are mapped to within destination reference boundary descriptor region 200. In this way, specular highlights, shadow blacks, and saturated colors can still be properly reproduced on the output medium by the destination device, even though only the source reference boundary descriptor region is known for the source device.

As further seen in the scenario depicted in FIG. 11, the gray color points of source neutral color tone spline 207 are mapped to destination neutral color tone spline 207. For example, the source whitest-white color and source blackest-black color are mapped from the outer edges of source reference boundary descriptor region 200 to the destination whitest-white color and destination blackest-black color at the outer edges of destination plausible boundary descriptor region 210. In this scenario, source reference-white color 211 and source reference-black color 212 are mapped from positions inside of the outer edges of source reference boundary descriptor region 200 to destination reference-white color 211 and destination reference-black color 212 located at the outer edges of destination reference boundary descriptor region 200. In this manner, reference-white color 211 and reference-black color 212 from inside the range of source reference colors are extended along destination neutral color tone spline 207 to be located at the outer edges of the destination reference colors, so as to utilize the full known range of the source reference colors to include specular highlight colors, shadow black colors and saturated colors from the source color image data into the reproduced output image. Accordingly, the foregoing color mapping technique accommodates the scenario in which the color descriptor data structure for the destination device has multiple, "uncollapsed" boundary descriptor regions, but the color descriptor data structure for the source device has single-spaced, "collapsed" boundary descriptor regions, while still achieving a more accurate and desired reproduced image on the output medium.

Figure 12:
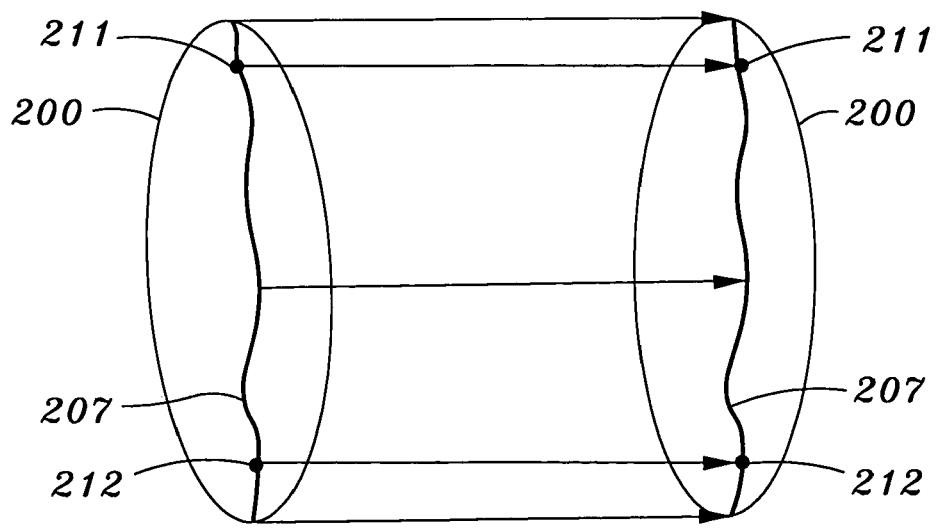
FIG. 12 is a diagram depicting a mapping of colors from a single source boundary descriptor region to a single destination boundary descriptor region according to one embodiment of the invention.

FIG. 12 depicts a scenario in which both the source and destination color descriptor data structures describe boundary regions which are collapsed onto the single space of their respective reference boundary descriptor regions 200. As seen in FIG. 12, a color mapping scheme is depicted in which colors in an area of source reference boundary descriptor region 200 which is located from source reference-white color 211 and the source reference-black color 212 to the outer edge of source reference boundary descriptor region 200, are mapped to an area of destination reference boundary descriptor region 200 which is located from destination reference-white color 211 and the destination reference-black color 212 to the outer edge of destination reference boundary descriptor region 200. Similarly, remaining colors located between source reference-white color 211 and source reference-black color 212 in source reference boundary descriptor region 200 are mapped to an area between destination reference-white color 211 and destination reference-black color 212 in destination reference boundary descriptor region 200. In this way, specular highlights, shadow blacks, and saturated colors can still be properly reproduced on the output medium by the destination device, even though only the reference boundary descriptor region is known for both the source and destination devices.

As further seen in the scenario depicted in FIG. 12, the gray color points of source neutral color tone spline 207 are mapped to destination neutral color tone spline 207. For example, the source whitest-white color and source blackest-black color are mapped from the outer edges of source reference boundary descriptor region 200 to the destination whitest-white color and destination blackest-black color at the outer edges of destination reference boundary descriptor region 200. In this scenario, source reference-white color 211 and source reference-black color 212 are mapped from positions inside of the outer edges of source reference boundary descriptor region 200 to destination reference-white color 211 and destination reference-black color 212 located at positions inside of the outer edges of destination reference boundary descriptor region 200. In this manner, reference-white color 211 and reference-black color 212 from inside the range of source reference colors are mapped to corresponding positions inside the range of destination reference colors, thereby utilizing the full known range of the source and destination reference colors to include specular highlight colors, shadow black colors and saturated colors from the source color image data into the reproduced output image. Accordingly, the foregoing color mapping technique accommodates the scenario in which the color descriptor data structures for both the source and destination devices have single-spaced, "collapsed" boundary descriptor regions, while still achieving a more accurate and desired reproduced image on the output medium.

Figure 13:
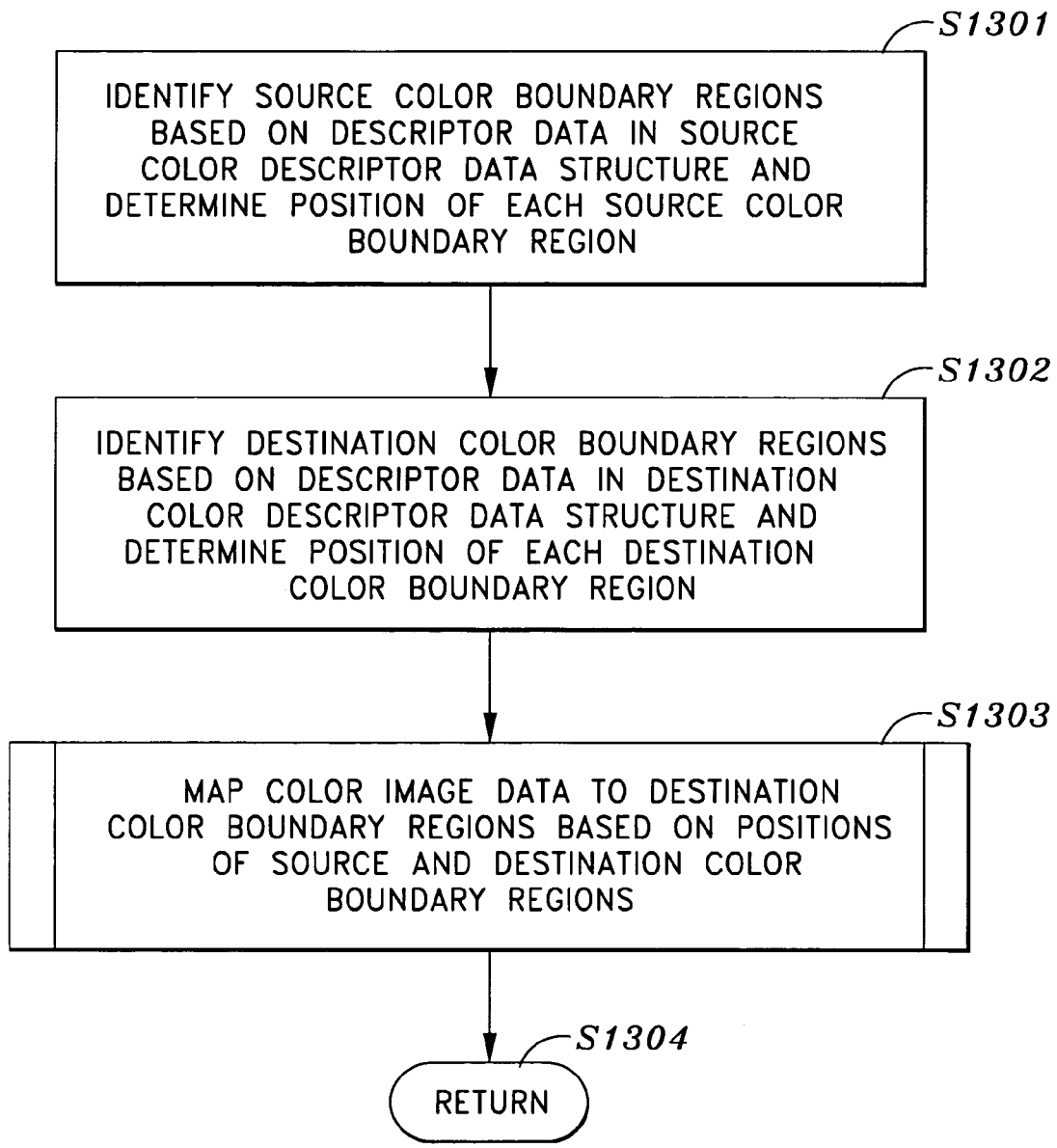
FIG. 13 is a flow chart for generally explaining the mapping of colors between source boundary descriptor regions and destination boundary descriptor regions according to one embodiment of the invention.

FIG. 13 is a flow chart which explains the general steps for mapping colors between source boundary descriptor regions and destination boundary descriptor regions according to the invention. In step S1301, the source color boundary descriptor regions are identified by inspecting the descriptor data in a corresponding source color data descriptor structure, such as one of color data descriptor structures 139. For example, the color vertices data under each of reference boundary descriptor shell 264, plausible boundary descriptor shell 270, possible boundary descriptor shell 274, and neutral color spline 278 are accessed from a source color data descriptor structure and analyzed to determined the respective boundary regions and the neutral color tone spline for the corresponding source color device. Similarly, in step S1302, the destination color boundary descriptor regions are identified by inspecting the descriptor data in a corresponding destination color data descriptor structure to determine the respective boundary regions and the neutral color tone spline for the corresponding destination color device. Next, in step S1303, the color image data is mapped to the destination color boundary descriptor regions based on the relative shapes, sizes and positions of the source color boundary descriptor regions with respect to the shapes, sizes and positions of the destination color boundary descriptor regions, as described above in reference to FIGS. 9 to 12. Step S1303 is explained in more detail below with respect to FIG. 14. The process flow of FIG. 13 ends at "return" in step S1304.

Figure 14:
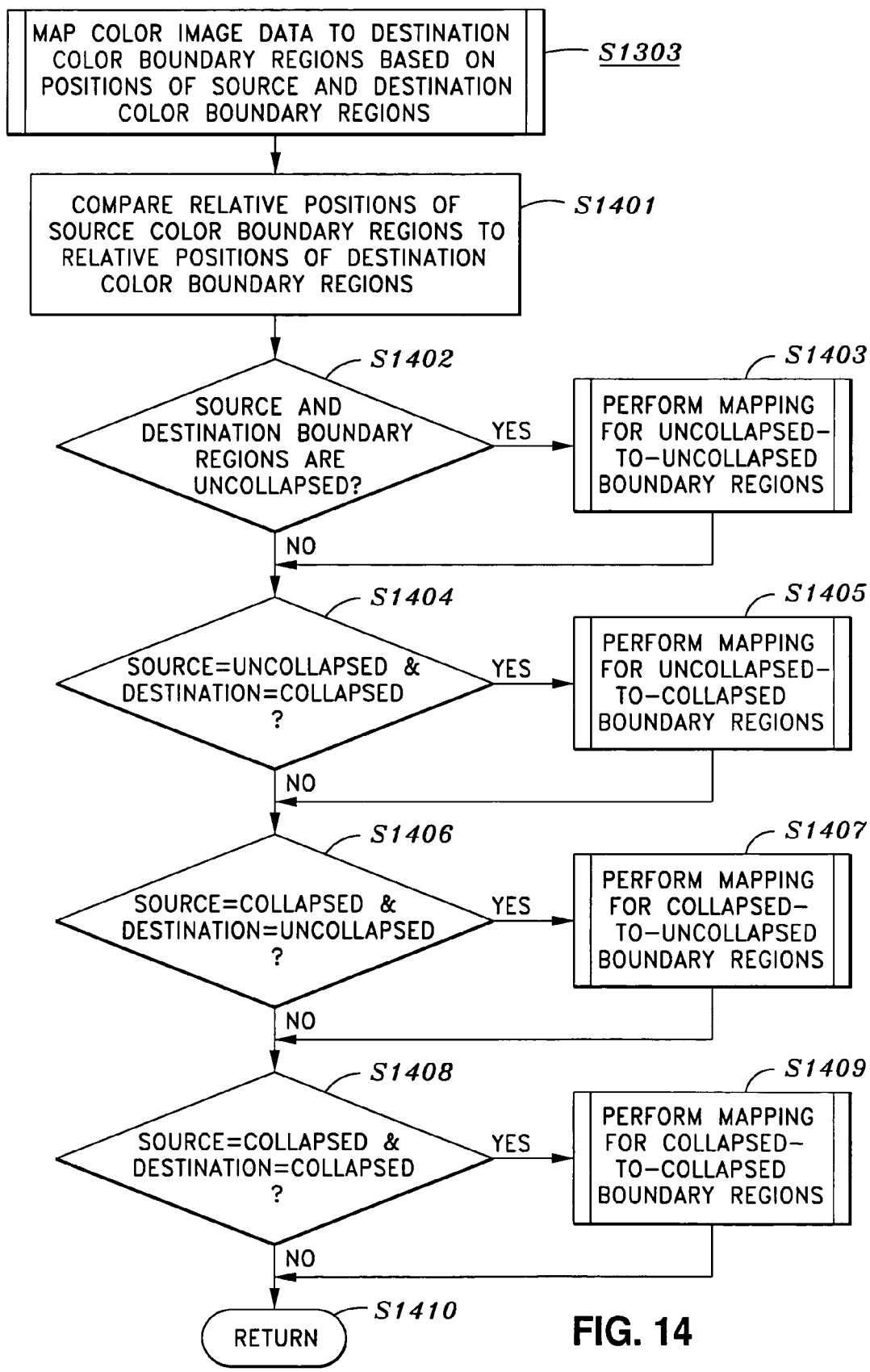
FIG. 14 is a flow chart for explaining in more detail the mapping step depicted in FIG. 13 according to one embodiment of the invention.

FIG. 14 is a flow chart which explains in more detail the mapping step S1303 of FIG. 13 according to the invention. In step S1401, the relative shapes, sizes and positions of the identified source color boundary descriptor regions are compared to the shapes, sizes and positions of the identified destination color boundary descriptor regions. Next, in step S1402, it is determined if the boundary descriptor regions for both the source device and the destination device are "uncollapsed", thereby being multiple, separately-spaced boundary descriptor regions. If not, process flow proceeds to step S1404. If so, process flow passes to step S1403 in which mapping of the color image data is performed based on a particular mapping scheme for uncollapsed-to-uncollapsed boundary descriptor regions, as described more fully below with respect to FIG. 15. Such a scenario corresponds to the depiction of the source and destination boundary descriptor regions in FIG. 9. Process flow then proceeds to step S1404.

Next, in step S1404, it is determined if the source boundary descriptor regions are "uncollapsed", thereby being multiple, separately-spaced boundary descriptor regions, and if the destination boundary descriptor regions are "collapsed", thereby being collapsed onto the single space of destination reference boundary descriptor region 200. If not, process flow proceeds to step S1406. If so, process flow passes to step S1405 in which mapping of the color image data is performed based on a particular mapping scheme for uncollapsed-to-collapsed boundary descriptor regions, as described more fully below with respect to FIG. 16. Such a scenario corresponds to the depiction of the source and destination boundary descriptor regions in FIG. 10. Process flow then proceeds to step S1406.

Next, in step S1406, it is determined if the destination boundary descriptor regions are "uncollapsed", thereby being multiple, separately-spaced boundary descriptor regions, and if the source boundary descriptor regions are "collapsed", thereby being collapsed onto the single space of source reference boundary descriptor region 200. If not, process flow proceeds to step S1408. If so, process flow passes to step S1407 in which mapping of the color image data is performed based on a particular mapping scheme for collapsed-to-uncollapsed boundary descriptor regions, as described more fully below with respect to FIG. 17. Such a scenario corresponds to the depiction of the source and destination boundary descriptor regions in FIG. 11. Process flow then proceeds to step S1408.

Next, in step S1408, it is determined if both the source and destination boundary descriptor regions "collapsed", thereby being collapsed onto the single space of their respective reference boundary descriptor regions 200. If not, process flow proceeds to "return" in step S1410. If so, process flow passes to step S1409 in which mapping of the color image data is performed based on a particular mapping scheme for collapsed-to-collapsed boundary descriptor regions, as described more fully below with respect to FIG. 18. Such a scenario corresponds to the depiction of the source and destination boundary descriptor regions in FIG. 12. Process flow then proceeds to "return" in step S1410.

Figure 15:
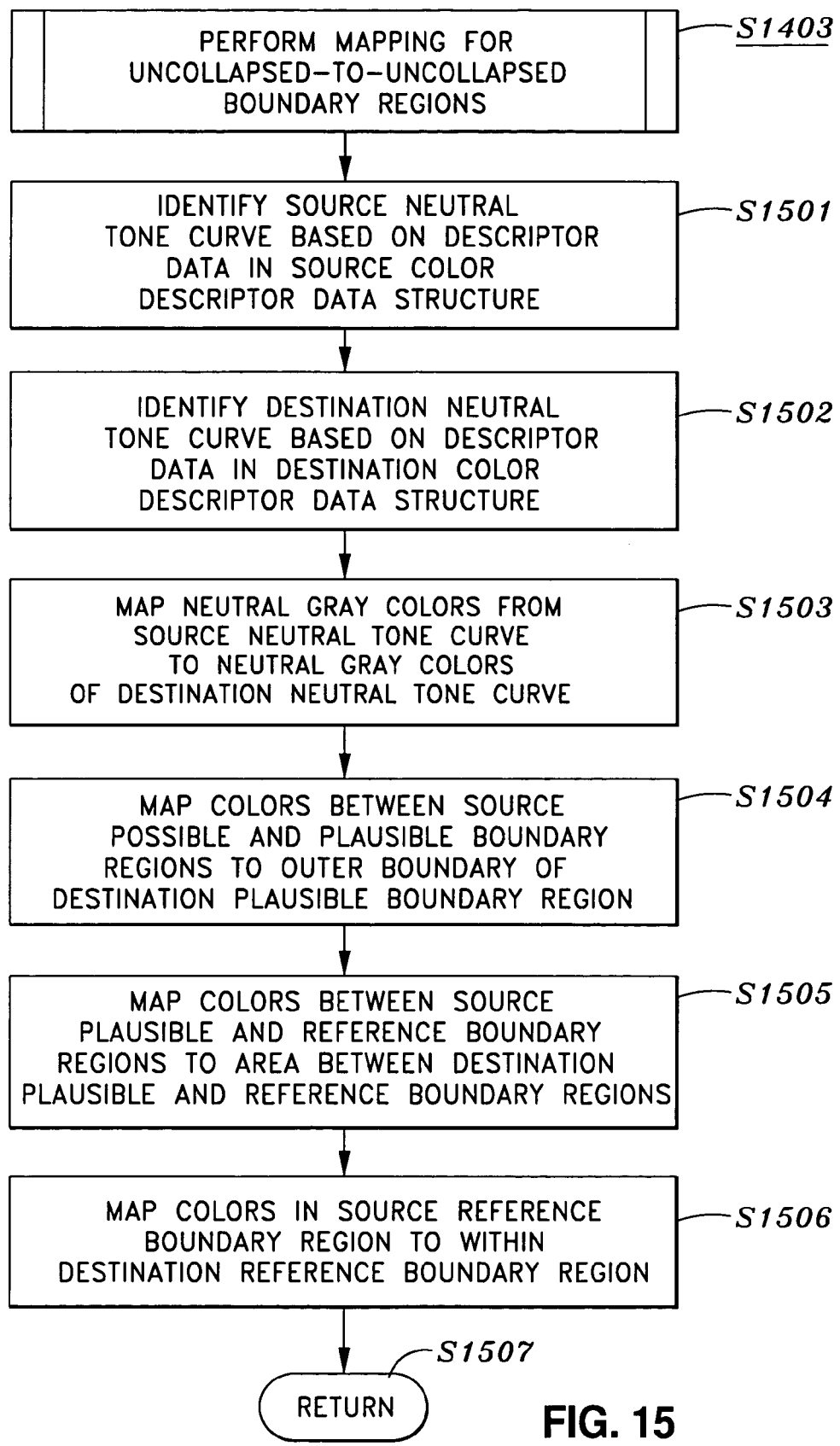
FIG. 15 is a flow chart for explaining in more detail the color mapping step for uncollapsed-to-uncollapsed boundary regions depicted in FIG. 14 according to one embodiment of the invention.

FIG. 15 is a flow chart for explaining in more detail mapping step S1403 of FIG. 14, in which color image data is mapped based on a particular mapping scheme for the scenario in which the boundary descriptor regions for both the source and destination devices are uncollapsed, as depicted in FIG. 9. In step S1501, the source neutral color tone spline (curve) is identified by accessing the neutral color nodes set under neutral color spline 278 in the corresponding source color data descriptor structure and determining the source neutral color tone spline from the accessed data. Similarly, the destination neutral color tone spline (curve) is identified by accessing the neutral color nodes set under neutral color spline 278 in the corresponding destination color data descriptor structure and determining the destination neutral color tone spline from the accessed data (step S1502). Next, in step S1503, the neutral gray color colors of source neutral color tone spline 207 are mapped to the neutral gray color colors of destination neutral color tone spline 207. For example, the source whitest-white color, source reference-white color, source mid-tone gray color, source reference-black color and source blackest-black color of source neutral color tone spline 207 are mapped to the destination whitest-white color, destination reference-white color, destination mid-tone gray color, destination reference-black color and destination blackest-black color of destination neutral color tone spline 207, in a manner as discussed above with respect to FIG. 9.

In step S1504, the colors located in source possible boundary descriptor region 220 but which are outside of source plausible boundary descriptor region 210 are mapped to the outer boundary of destination plausible boundary descriptor region 210. In this way, colors outside the source device plausible color production range are clipped to the outer limits of the destination device plausible color production range. Similarly, in step S1505, colors located in source plausible boundary descriptor region 210 but which are outside of source reference boundary descriptor region 200 are mapped to an area in destination plausible boundary descriptor region 210 that is outside of destination reference boundary descriptor region 200. In this way, colors within the source device plausible color production range, but not within the source device reference color range, are mapped to be within an area of the destination device plausible color production range which is outside the destination device reference color range. Next, all colors within source reference boundary descriptor region 200 are mapped to be within destination reference boundary descriptor region 200 in step S1506. Process flow then passes to return in step S1507. In this manner, the foregoing color mapping technique takes full advantage of the multiple "uncollapsed" boundary descriptor regions for each of the source and destination devices in order to achieve a more accurate and desired reproduced image on the output medium.

Figure 16:
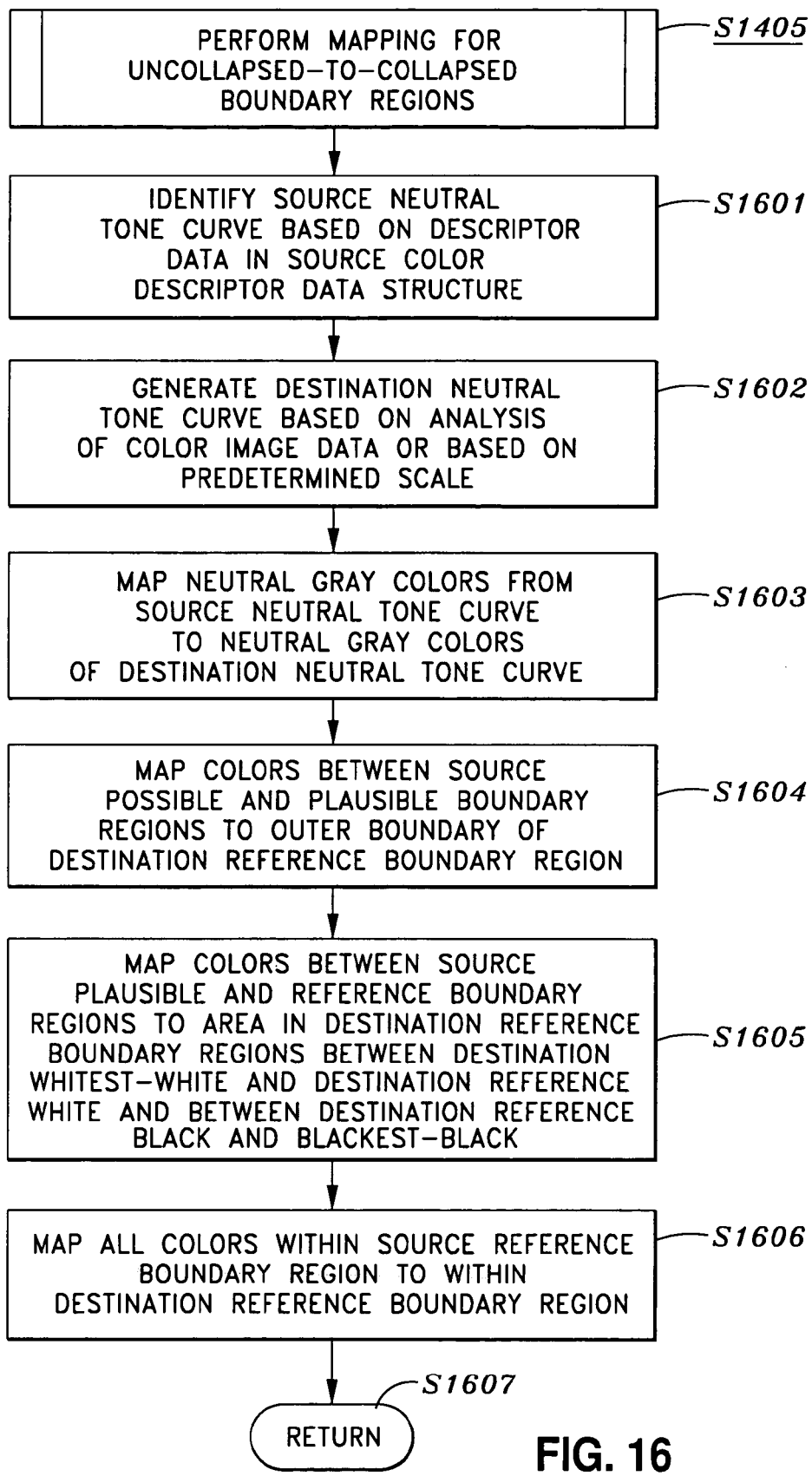
FIG. 16 is a flow chart for explaining in more detail the color mapping step for uncollapsed-to-collapsed boundary regions depicted in FIG. 14 according to one embodiment of the invention.

FIG. 16 is a flow chart for explaining in more detail mapping step S1405 of FIG. 14, in which color image data is mapped based on a particular mapping scheme for the scenario in which the boundary descriptor regions for the source device is uncollapsed, and the boundary descriptor region for the destination device is collapsed, as depicted in FIG. 10. In step S1601, the source neutral color tone spline (curve) is identified by accessing the neutral color nodes set under neutral color spline 278 in the corresponding source color data descriptor structure and determining the source neutral color tone spline from the accessed data. In step S1602, the destination neutral color tone spline (curve) can be generated by accessing the neutral color nodes set in the corresponding destination color data descriptor structure under neutral color spline 278 and determining the destination neutral color tone spline from the accessed data. In the alternative, when such data is not available in the destination color data descriptor structure, the destination neutral color tone spline can be generated by analyzing the color image data to be mapped and generating information such as a histogram of the tonal colors present, and then generating the destination neutral color tone spline based on the analysis results. Such a histogram can include a measurement of the amount of specular highlights and shadow blacks disposed between the image whitest-white and image reference-white, and between the image blackest-black and image reference-black, respectively.

In another alternative, the destination neutral color tone spline can be based on a predetermined scale. Next, in step S1603, the neutral gray color colors of identified source neutral color tone spline 207 are mapped to the neutral gray color colors of generated destination neutral color tone spline 207. For example, the source whitest-white color, source reference-white color, source mid-tone gray color, source reference-black color and source blackest-black color of source neutral color tone spline 207 are mapped to the destination whitest-white color, destination reference-white color, destination mid-tone gray color, destination reference-black color and destination blackest-black color of destination neutral color tone spline 207, in a manner as discussed above with respect to FIG. 10.

In step S1604, the colors located in source possible boundary descriptor region 220 but which are outside of source plausible boundary descriptor region 210 are mapped to the outer boundary of destination reference boundary descriptor region 200. In this way, colors outside the source device plausible color production range are clipped to the outer limits of the destination device reference color production range, since this is the only known boundary descriptor region for the destination device. In step S1605, colors located in source plausible boundary descriptor region 210 but which are outside of source reference boundary descriptor region 200 are mapped to an area within destination reference boundary descriptor region 200 which is between the destination reference-white and destination reference-black points and the outer edge of destination reference boundary descriptor region 200, on which the destination whitest-white and blackest-black colors are disposed. In this way, colors that are within the plausible color production range of the source device, but not within the source reference color range, are mapped to an area within the destination reference color range. In step S1606, all colors within source reference boundary descriptor region 200 are mapped to be within an area of destination reference boundary descriptor region 200 which is located between the destination reference-white and destination reference-black points.

Process flow then passes to return in step S1607. In this manner, the foregoing color mapping technique achieves a more accurate and desired reproduced image on the output medium, even though the color boundary descriptor regions for the destination device are collapsed onto the destination reference boundary descriptor region.

Figure 17:
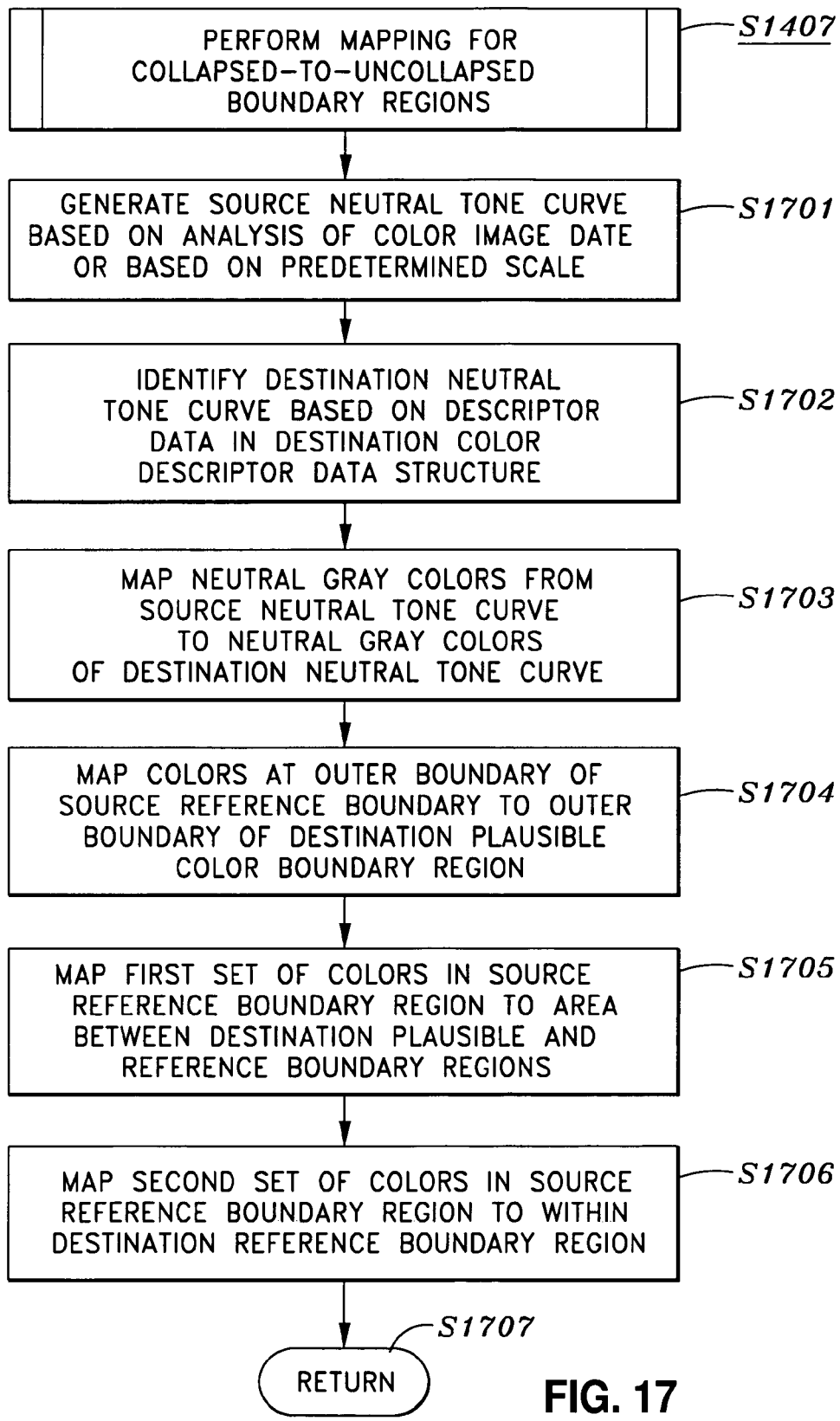
FIG. 17 is a flow chart for explaining in more detail the color mapping step for collapsed-to-uncollapsed boundary regions depicted in FIG. 14 according to one embodiment of the invention.

FIG. 17 is a flow chart for explaining in more detail mapping step S1407 of FIG. 14, in which color image data is mapped based on a particular mapping scheme for the scenario in which the boundary descriptor regions for the destination device is uncollapsed, and the boundary descriptor region for the source device is collapsed, as depicted in FIG. 11. In step S1701, the source neutral color tone spline (curve) can be generated by accessing the neutral color nodes set under neutral color spline 278 in the corresponding source color data descriptor structure and determining the source neutral color tone spline from the accessed data. In the alternative, when such data is not available in the source color data descriptor structure, the source neutral color tone spline can be generated by analyzing the color image data to be mapped and generating information such as a histogram of the tonal colors present, and then generating the source neutral color tone spline based on the analysis results. Such a histogram can include a measurement of the amount of specular highlights and shadow blacks disposed between the image whitest-white and image reference-white, and between the image blackest-black and image reference-black, respectively. In another alternative, the source neutral color tone spline can be based on a predetermined scale. In step S1702, the destination neutral color tone spline (curve) is identified by accessing the neutral color nodes set under neutral color spline 278 in the corresponding destination color data descriptor structure and determining the destination neutral color tone spline from the accessed data. Next, in step S1703, the neutral gray color colors of generated source neutral color tone spline 207 are mapped to the neutral gray color colors of identified destination neutral color tone spline 207. For example, the source whitest-white color, source reference-white color, source mid-tone gray color, source reference-black color and source blackest-black color of source neutral color tone spline 207 are mapped to the destination whitest-white color, destination reference-white color, destination mid-tone gray color, destination reference-black color and destination blackest-black color of destination neutral color tone spline 207, in a manner as discussed above with respect to FIG. 11.

In step S1704, the colors located at the outer boundary of source reference boundary descriptor region 200 are mapped to the outer boundary of destination plausible boundary descriptor region 210. In this way, colors outside the source device reference color range are clipped to the outer limits of the destination device plausible color production range, since the source reference range is the only known boundary descriptor region for the source device. In step S1705, a first set of colors located in source reference boundary descriptor region 200 are mapped to an area within destination plausible boundary descriptor region 210 which is outside destination reference boundary descriptor region 200. Next, in step S1706, a second set of colors located in source reference boundary descriptor region 200 are mapped to an area within destination reference boundary descriptor region 200.

Preferably, the first set of colors are disposed in source reference boundary descriptor region 200 between the source whitest-white color and reference-white color, and between the source blackest-black color and reference-black color. The second set of colors are preferably disposed in source reference boundary descriptor region 200 in an area within the source reference-white color and the source reference-black color. In this way, colors that represent specular highlights and shadow blacks within the reference color range of the source device are mapped to be within the destination plausible color range for appropriate reproduction on the output medium. Process flow then passes to return in step S1707. In this manner, the foregoing color mapping technique achieves a more accurate and desired reproduced image on the output medium, even though the color boundary descriptor regions for the source device are collapsed onto the source reference boundary descriptor region.

Figure 18:
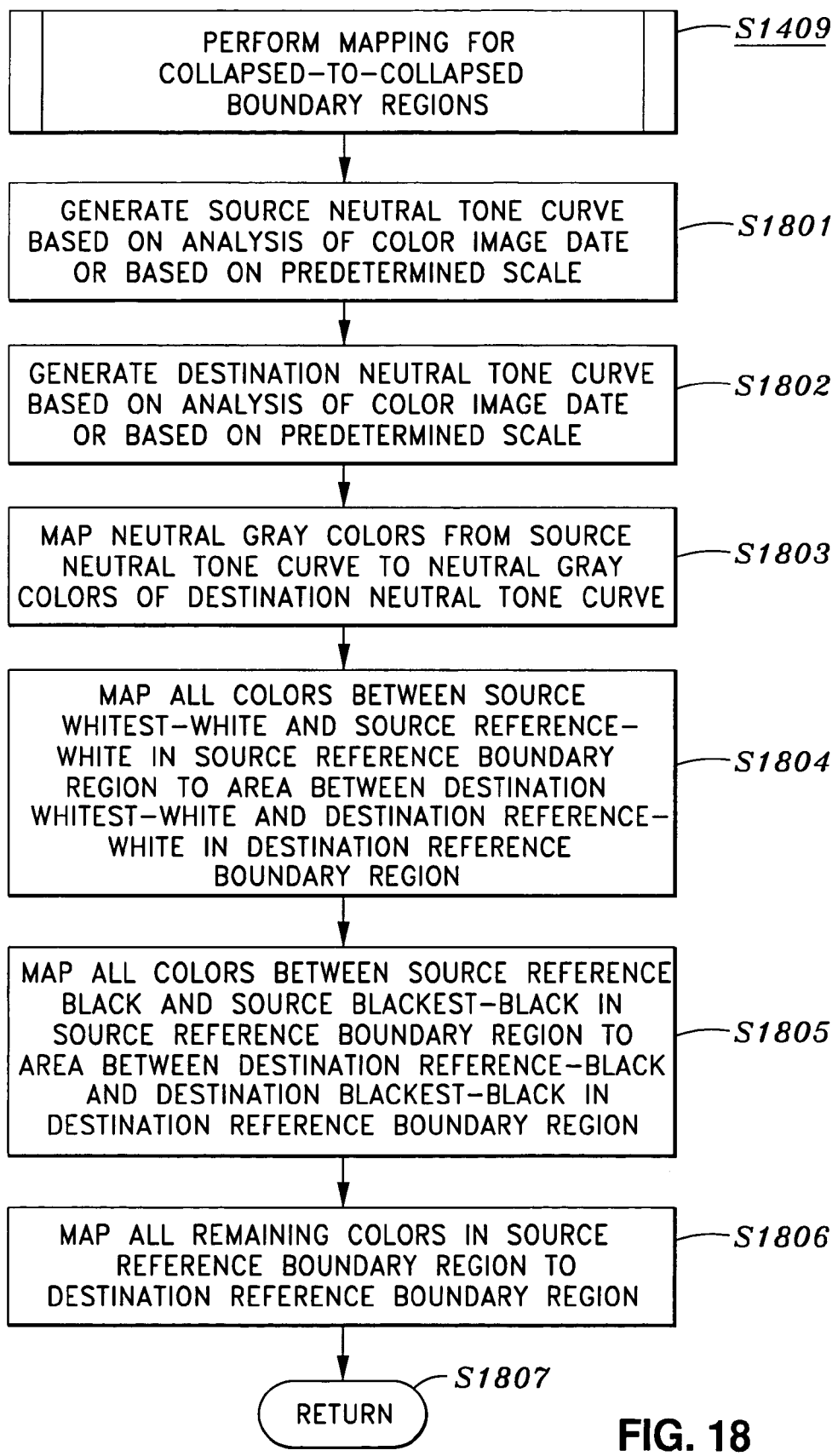
FIG. 18 is a flow chart for explaining in more detail the color mapping step for collapsed-to-collapsed boundary regions depicted in FIG. 14 according to one embodiment of the invention.

FIG. 18 is a flow chart for explaining in more detail mapping step S1409 of FIG. 14, in which color image data is mapped based on a particular mapping scheme for the scenario in which the boundary descriptor regions for both the source and destination devices are collapsed, as depicted in FIG. 12. In step S1801, the source neutral color tone spline (curve) can be generated by accessing the neutral color nodes set under neutral color spline 278 in the corresponding source color data descriptor structure and determining the source neutral color tone spline from the accessed data. In the alternative, when such data is not available in the source color data descriptor structure, the source neutral color tone spline can be generated by analyzing the color image data to be mapped and generating information such as a histogram of the tonal colors present, and then generating the source neutral color tone spline based on the analysis results. Such a histogram can include a measurement of the amount of specular highlights and shadow blacks disposed between the image whitest-white and image reference-white, and between the image blackest-black and image reference-black, respectively. In another alternative, the source neutral color tone spline can be based on a predetermined scale.

Similarly, in step S1802, the destination neutral color tone spline (curve) can also be generated according to any one of methods described above in step S1801. Next, in step S180, the neutral gray color colors of generated source neutral color tone spline 207 are mapped to the neutral gray color colors of generated destination neutral color tone spline 207. For example, the source whitest-white color, source reference-white color, source mid-tone gray color, source reference-black color and source blackest-black color of source neutral color tone spline 207 are mapped to the destination whitest-white color, destination reference-white color, destination mid-tone gray color, destination reference-black color and destination blackest-black color of destination neutral color tone spline 207, in a manner as discussed above with respect to FIG. 12.

In step S1804, the colors located in source reference boundary descriptor region 200 between the source whitest-white color and reference-white color are mapped to a corresponding area in destination reference boundary descriptor region 200 between the destination whitest-white color and the destination reference-white color. Next, in step S1805, the colors located in source reference boundary descriptor region 200 between the source reference-black color and the source blackest-black color are mapped to a corresponding area in destination reference boundary descriptor region 200 between the destination reference-black color and the destination blackest-black color. All remaining colors in source reference boundary descriptor region 200 in the area between the source reference-white color and the source reference-black color are mapped to a corresponding area in destination reference boundary descriptor region 200 between the destination reference-white color and the destination reference-black color in step S1806. Process flow then passes to return in step S1807. In this manner, the foregoing color mapping technique achieves a more accurate and desired reproduced image on the output medium, even though the color boundary descriptor regions for both the source and destination device are collapsed onto their respective reference boundary descriptor regions.

According to the foregoing features, the present invention appropriately gamut maps the range of colors of a source input device or a source image that range from the source reference (measured) colors, such as diffuse white and shadow black, up to the source plausible (reasonably expected) colors, such as whitest-white and blackest black, into appropriate corresponding regions in the color gamut of the destination medium, and also appropriately gamut maps the neutral gray colors of the source input device or source image into the neutral gray colors of the destination medium, even when the respective color boundaries of the source and destination are of different shapes and sizes.

It should be appreciated that the foregoing mapping techniques of the invention can be carried out in a color management module, such as color management module 142, which can be a standalone module or part of a device driver program for an output device, such as printer driver 134. In the alternative, the functionality of the invention can also be implemented in other applications, modules, and/or computer-executable process steps executed in a computing device, or stored on a computer-readable medium.

Although the invention has been described with particular illustrative embodiments, the invention is not limited to the above-described embodiments and various changes and modification may be made by those of ordinary skill in the art without departing from the spirit and scope of the invention.

What is claimed is:

1. A method for mapping color image data from a source color gamut to a destination color gamut, the method comprising the steps of:
   identifying plural source color boundary regions in the source color gamut based on boundary descriptor data which describes the boundary regions of the source color gamut, and determining a position of each one of said identified source color boundary regions, wherein the boundary descriptor data is provided in a source color descriptor data structure;
   identifying plural destination color boundary regions in the destination color gamut based on boundary descriptor data which describes the boundary regions of the destination color gamut, and determining a position of each one of said identified destination color boundary regions, wherein the boundary descriptor data is provided in a destination color descriptor data structure; and
   mapping the color image data from the identified source color boundary regions to the identified destination color boundary regions based on a correspondence between the determined positions of the identified source color boundary regions and the determined positions of the identified destination color boundary regions;
   wherein the source color descriptor data structure includes boundary descriptor data that defines:
   a source reference color boundary region representing reference colors based on measured colors and including a source reference-white color and a source reference-black color,
   a source plausible color boundary region representing plausible colors which are observable, encompassing at least the source reference color boundary region and including a source whitest-white color and a source blackest-black color, and
   a source possible color boundary region representing possible colors supported by a predetermined color encoding scheme and encompassing at least the source plausible color boundary region;
   wherein the destination color descriptor data structure includes boundary descriptor data that defines:
   a destination reference color boundary region representing reference colors based on measured colors and including a destination reference-white color and a destination reference-black color,
   a destination plausible color boundary region representing plausible colors which are observable, encompassing at least the destination reference color boundary region and including a destination whitest-white color and a destination blackest-black color, and
   a destination possible color boundary region representing possible colors supported by a predetermined color encoding scheme and encompassing at least the destination plausible color boundary region; and
   wherein said mapping step:
   maps all colors disposed between the source possible color boundary region and the source plausible color boundary region to an outer boundary of the destination plausible color boundary region,
   maps all colors disposed between the source plausible color boundary region and the source reference color boundary region to be disposed inside an outer boundary of the destination plausible color boundary region, and
   maps all colors within the source reference color boundary region to be disposed within the destination reference color boundary region.

2. A method according to claim 1, wherein said mapping step
   maps all colors disposed between the source plausible color boundary region and the source reference color boundary region to be disposed between the destination plausible color boundary region and the destination reference color boundary region.

3. A method according to claim 1, further comprising the steps of:
   identifying a source neutral tone curve based on descriptor data provided in the source color descriptor data structure, the source neutral tone curve including the source whitest-white color, the source reference-white color, a source middle gray color, the source reference-black color and the source blackest-black color; and
   identifying a destination neutral tone curve based on descriptor data provided in the destination color descriptor data structure, the destination neutral tone curve including the destination whitest-white color, the destination reference-white color, a destination middle gray color, the destination reference-black color and the destination blackest-black color,
   wherein, in the mapping step, the source whitest-white color, the source reference-white color, the source middle gray color, the source reference-black color and the source blackest-black color of the identified source neutral tone curve are mapped to the destination whitest-white color, the destination reference-white color, the destination middle gray color, the destination reference-black color and the destination blackest-black color of the identified destination neutral tone curve, respectively.

4. A method according to claim 1, wherein said mapping step:
   maps all colors disposed between the source possible color boundary region and the source plausible color boundary region to an outer boundary of the destination reference color boundary region,
   maps all colors disposed between the source plausible color boundary region and the source reference color boundary region to be disposed within the destination reference color boundary region, and maps all colors within the source reference color boundary region to be disposed within the destination reference color boundary region.

5. A method according to claim 4, further comprising the steps of:
identifying a source neutral tone curve based on descriptor data provided in the source color descriptor data structure, the source neutral tone curve including the source whitest-white color, the source reference-white color, a source middle gray color, the source reference-black color and the source blackest-black color; and
generating a destination neutral tone curve including the destination whitest-white color, the destination reference-white color, a destination middle gray color, the destination reference-black color and the destination blackest-black color,
wherein, in the mapping step, the source whitest-white color, the source reference-white color, the source middle gray color, the source reference-black color and the source blackest-black color of the identified source neutral tone curve are mapped to the destination whitest-white color, the destination reference-white color, the destination middle gray color, the destination reference-black color and the destination blackest-black color of the generated destination neutral tone curve, respectively.

6. A method according to claim 5, wherein all colors disposed between the source plausible color boundary region and the source reference color boundary region are mapped to be disposed within the destination reference color boundary region located in an area between the destination whitest-white color and the destination reference-white color, and in an area between the destination reference-black color and the destination blackest-black color.

7. A method according to claim 5, wherein the destination neutral tone curve is generated based on an analysis of the color image data.

8. A method according to claim 7, wherein the analysis of the color image data determines an amount of the color image data disposed between an image whitest-white color and an image reference-white color, and an amount of the color image data disposed between an image reference-black color and an image blackest-black color.

9. A method according to claim 5, wherein the destination neutral tone curve is generated based on a predetermined scale.

10. A computing device for mapping color image data from a source color gamut to a destination color gamut, comprising:
a program memory for storing process steps executable to perform a method according to any of claims 1 or 2 to 9; and
a processor for executing the process steps stored in said program memory.

11. A computer-readable medium which stores computer-executable process steps, the computer-executable process steps for mapping color image data from a source color gamut to a destination color gamut, said computer-executable process steps comprising process steps executable to perform a method according to any of claims 1 or 2 to 9.

12. A method for mapping color data from a source color gamut to a destination color gamut, the method comprising the steps of:
determining plural source color boundary regions in the source color gamut, wherein said plural source color boundary regions include a source reference color boundary region based on measured source color data and a source plausible color boundary region based on a source device mathematical color model;
determining plural destination color boundary regions in the destination color gamut, wherein said plural destination color boundary regions include a destination reference color boundary region based on measured destination color data and a destination plausible color boundary region based on a destination device mathematical color model;
mapping an input color which is outside of the source reference color boundary region and inside the source plausible color boundary region to an output color which is outside the destination reference color boundary region and inside the destination plausible color boundary region; and
mapping an input color which is inside the source reference color boundary region to an output color which is inside the destination reference color region.

13. A method according to claim 12, wherein the plural source color boundary regions include a source possible color boundary region representing an allowable range of a predetermined encoding scheme being used to represent the color; and
wherein the plural destination color boundary regions include a destination possible color boundary region representing an allowable range of a predetermined encoding scheme being used to represent the color; and
wherein the mapping step is performed by mapping an input color which is outside the source plausible color boundary region and inside the source possible color boundary region to an output color which is on a boundary between the destination plausible color boundary and the destination possible color boundary region.

14. An apparatus for mapping color data from a source color gamut to a destination color gamut, comprising:
a memory for storing process steps executable to perform the mapping of the color data; and
a processor for executing the process steps stored in said memory;
wherein the process steps comprise:
a determining step to determine plural source color boundary regions in the source color gamut, wherein said plural source color boundary regions include a source reference color boundary region based on measured source color data and a source plausible color boundary region based on a source device mathematical color model;
a determining step to determine plural destination color boundary regions in the destination color gamut, wherein said plural destination color boundary regions include a destination reference color boundary region based on measured destination color data and a destination plausible color boundary region based on a destination device mathematical color model; and
a mapping step to map an input color which is outside of the source reference color boundary region and inside the source plausible color boundary region to an output color which is outside the destination reference color boundary region and inside the destination plausible color boundary region; and
a mapping step to map an input color which is inside the source reference color boundary region to an output color which is inside the destination reference color boundary region.

15. A computer-readable memory medium which stores computer-executable process steps for mapping color data from a source color gamut to a destination color gamut, wherein said computer-executable process steps comprise:
- a determining step to determine plural source color boundary regions in the source color gamut, wherein said plural source color boundary regions include a source reference color boundary region based on measured source color data and a source plausible color boundary region based on a source device mathematical color model;
- a determining step to determine plural destination color boundary regions in the destination color gamut, wherein said plural destination color boundary regions include a destination reference color boundary region based on measured destination color data and a destination plausible color boundary region based on a destination device mathematical color model, and
- a mapping step to map an input color which is outside of the source reference color boundary region and inside the source plausible color boundary region to an output color which is outside the destination reference color boundary region and inside the destination plausible color boundary region; and
- mapping step to map an input color which is inside the source reference color boundary region to an output color which is inside the destination reference color region.

* * * * *